United States Patent [19]

Nakao

[11] Patent Number: 5,506,799
[45] Date of Patent: Apr. 9, 1996

[54] BOOTH ARRAY MULTIPLYING CIRCUIT HAVING CARRY CORRECTION

[75] Inventor: Yuichi Nakao, Itami, Japan

[73] Assignee: Mitsubishi Denki Kabushi Kaisha, Tokyo, Japan

[21] Appl. No.: 266,085

[22] Filed: Jun. 24, 1994

[30] Foreign Application Priority Data

Jun. 25, 1993 [JP] Japan .................................. 5-155181

[51] Int. Cl.$^6$ ........................................ G06F 7/52
[52] U.S. Cl. ........................................ 364/760
[58] Field of Search ........................ 364/760, 736, 364/759

[56] References Cited

U.S. PATENT DOCUMENTS

| | | | |
|---|---|---|---|
| 4,546,446 | 10/1985 | Machida | 364/759 |
| 5,231,415 | 7/1993 | Hagihara | 364/760 |
| 5,303,178 | 4/1994 | Ozaki | 364/760 |

*Primary Examiner*—Tan V. Mai
*Attorney, Agent, or Firm*—Lowe, Price, LeBlanc & Becker

[57] ABSTRACT

A multiplying circuit having sign carry correcting circuits which set all bits of a multiplier Y subjected to sign extension to a certain specific value ("0" or "1"), and when a sign bit, which is the highest bit of effective data in the data to be multiplied, is carried, a specific value signal is input to a bit input portion of a Booth decoder, receiving both the least significant invalid bit and the most significant effective bit of the multiplier, according to a value of a sign extension control signal. In addition, a value inputted to partial product adding circuits from an intermediate result shift circuit is set to a multiplicand value according to the value of a predetermined number of least significant bits of the multiplier, and the multiplier bits excluding the predetermined number of least significant bits inputted to the intermediate result shift circuit are inputted to multiple generating circuits. Thus, a sign extension function or the number of adding circuits to be added in the case of producing a remainder in the number of partial products, at the time of dividing the multiplication into a plurality of operation cycles, are reduced to suppress a circuit scale from becoming larger.

4 Claims, 28 Drawing Sheets

FIG. 2
PRIOR ART

| INPUT | | | OUTPUT | | | OUTPUT OF CORRESPONDING MULTIPLE GENERATING CIRCUIT |
|---|---|---|---|---|---|---|
| $Y_{2i+1}$ | $Y_{2i}$ | $Y_{2i-1}$ | SIGN SIGNAL | ONE-TIME SIGNAL | TWO-TIME SIGNAL | |
| 0 | 0 | 0 | 1 | 0 | 0 | +0 |
| 0 | 0 | 1 | 1 | 1 | 0 | +X |
| 0 | 1 | 0 | 1 | 1 | 0 | +X |
| 0 | 1 | 1 | 1 | 0 | 1 | +2X |
| 1 | 0 | 0 | 0 | 0 | 1 | −2X |
| 1 | 0 | 1 | 0 | 1 | 0 | −X |
| 1 | 1 | 0 | 0 | 1 | 0 | −X |
| 1 | 1 | 1 | 0 | 0 | 0 | +0 |

FIG. 6

| INPUT SIGNAL | | OUTPUT SIGNAL | | | |
|---|---|---|---|---|---|
| HALF WORD SIZE SIGNAL 3 | BYTE SIZE SIGNAL 4 | HIGHER HALF WORD SET SIGNAL SETHW | HIGHER HALF WORD RESET SIGNAL RSTHW | 2nd LOWER BYTE SET SIGNAL SETBT | 2nd LOWER BYTE RESET SIGNAL RSTBT |
| 0 | 0 | 0 | 0 | 0 | 0 |
| 0 | 1 | Y7 | #Y7 | Y7 | #Y7 |
| 1 | 0 | Y15 | #Y15 | 0 | 0 |
| 1 | 1 | INHIBITION CONDITION | | | |

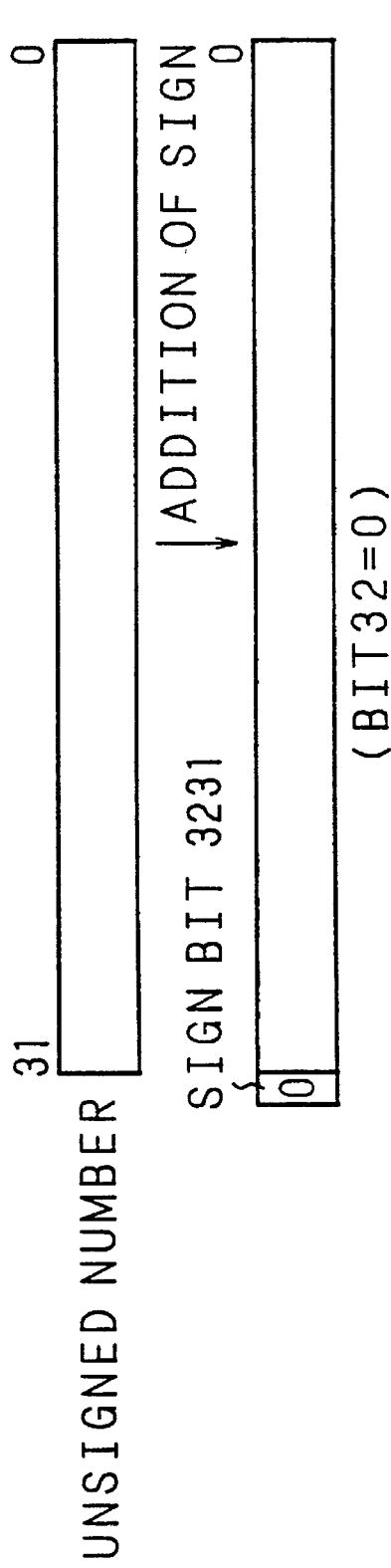
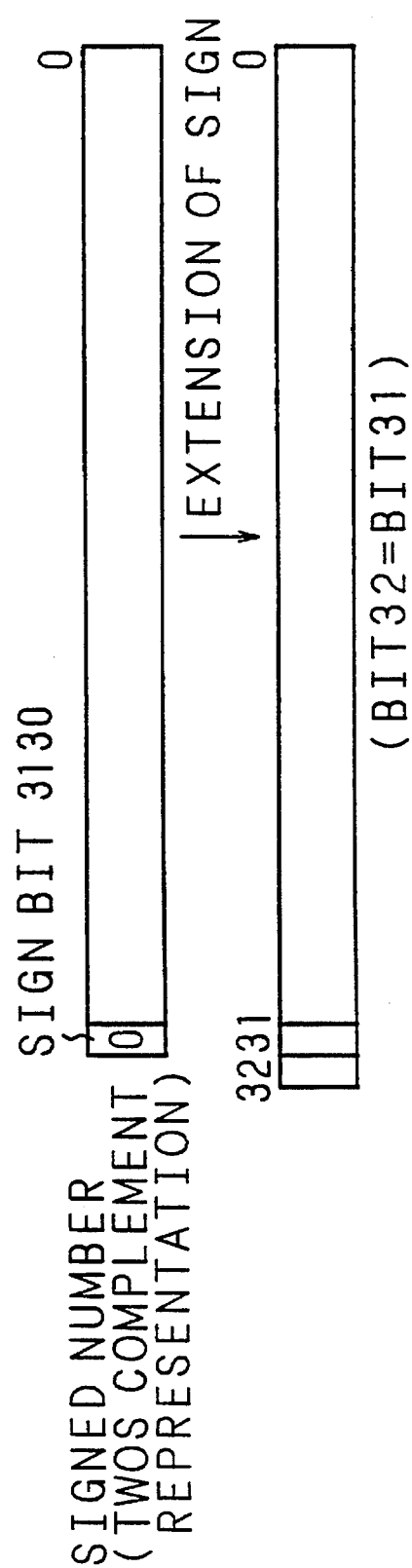
FIG. 8A PRIOR ART
FIG. 8B PRIOR ART

FIG. 13
PRIOR ART

| INITIALIZING CONTROL SIGNAL | RISING TRANSITION CONTROL SIGNAL | OUTPUT OF SHIFT CIRCUIT |
|---|---|---|
| 1 | NEGATIVE | 0 |
| 0 | POSITIVE | CARRY INTERMEDIATE RESULT |
| 0 | NEGATIVE | HOLDING VALUE |
| 1 | POSITIVE | (INHIBITION CONDITION) |

FIG. 18

| INPUT SIGNAL | | OUTPUT SIGNAL | |
|---|---|---|---|
| HALF WORD SIZE SIGNAL 3 | BYTE SIZE SIGNAL 4 | HIGHER HALF WORD EXTENSION SIGNAL EXTHW | 2nd LOWER BYTE EXTENSION SIGNAL EXTBT |
| 0 | 0 | 0 | 0 |
| 0 | 1 | 1 | 1 |
| 1 | 0 | 1 | 0 |
| 1 | 1 | INHIBITION CONDITION | |

FIG. 25

| INITIALIZING CONTROL SIGNAL | RISING TRANSITION CONTROL SIGNAL | OUTPUT OF SHIFT CIRCUIT |
|---|---|---|
| 1 | NEGATIVE | Y<1>xX<32:0> |
| 0 | POSITIVE | CARRY INTERMEDIATE RESULT |
| 0 | NEGATIVE | HOLDING VALUE |
| 1 | POSITIVE | (INHIBITION CONDITION) |

BOOTH ARRAY MULTIPLYING CIRCUIT HAVING CARRY CORRECTION

BACKGROUND OF THE INVENTION

1. Field of the Invention

The present invention relates to a Booth Array type multiplying circuit which rapidly processes mutual binary multiplication in a data processing system in an electronic computer and the like, and to be more particular, firstly to a multiplying circuit including a function of sign extension of a multiplier, and secondly to a multiplying circuit which executes a desired multiplication by dividing it into a plurality of operation cycles, obtaining an intermediate result which is a partial sum of partial products in respective operation cycles, and repeating the operation cycles by transferring the intermediate result to the following operation cycle to obtain a multiplication result which is a sum of the entire partial products.

2. Description of the Related Art

It is generally known that, by Booth algorithm, the multiplication result by two's complement representation is obtained without arithmetic pre-processing or post-processing with respect to integers by two's complement representation, and is utilized in a multiplying circuit, in a data processing system.

At first, a multiplying algorithm and a sign extension of multiplier by the Booth algorithm are described, and then a conventional realizing method by its hardware is described.

The Booth algorithm is an algorithm devised by Andrew Donald Booth as a method of executing the multiplication rapidly. In general, at the time of executing the multiplication of digital data, multiplier data is divided into a plurality of bits to multiply with a multiplicand to produce partial products (multiples), which are added to obtain the multiplication result. In short, the Booth algorithm is that, at the time of executing the multiplication, by overlapping highest bits of the lower side division on respective divisions of the multiplier and adopting signed digit numbers, it is convenient when using digital numbers whose resulting multiplies are ±2, ±4 and so on, and is advantageous in that the number by two's complement representation can be multiplied directly.

FIG. 1 and FIG. 2 are schematic views showing a method of multiplication by the Booth algorithm conventionally used in general. Hereupon, an example of using the second degree Booth algorithm is shown.

Multiplication of a multiplicand X and a multiplier Y is executed by, as shown in FIG. 1 wherein the multiplicand X is shown as first input data and the multiplier Y is shown as second input data, at first, multiplying all bits of the multiplicand X by partial bits of the multiplier Y to calculate the partial products successively, and then obtaining a summation of the partial products.

In the second degree Booth algorithm, one partial product is produced for every two bits of the multiplier Y. Thus, as shown in FIG. 1, in the 32 bits×32 bits multiplication, the first. 2 bits Y<1:0> corresponding portion of the multiplier Y and the multiplicand X are multiplied to produce the first partial product, then the next 2 bits Y<3:2> corresponding portion of the multiplier Y and the multiplicand X are multiplied to produce the second partial product, and the partial products are produced thereafter successively to finally produce the 16th partial product by multiplying the last 2 bits Y<31:30> corresponding portion of the multiplier Y and the multiplicand X.

In this way, in the 32 bits×32 bits multiplication, 16 partial products are produced from the 1st to 16th partial products, and finally the 64-bit multiplication result P is obtained as their summation.

Operation rules of the partial product are shown in a table in FIG. 2.

The table in FIG. 2 shows the relationship between inputs, outputs and corresponding multiples of the Booth algorithm, more specifically, it shows 3-bit input signal values to Booth decoders to be described later, corresponding 3-bit output signal values and corresponding multiple generating circuit outputs.

The multiplier Y (input to the Booth decoders) used in the partial product operations is 3 bits, and the partial product is obtained in a 2-bit unit. And hence, bits of the multiplier Y having indices of odd number are inputted to two Booth decoders. That is, though the partial products of Y<2i+1> and Y<2i> are obtained at tile time of obtaining the "i+1"th partial product, the lower side Y<2i−1> is also used. Specifically, for example, at the time of obtaining the second partial product, the lower side Y<1> is also used besides Y<3> and Y<2>.

However, though Y<1> and Y<0> are used at the time of obtaining the first partial product, "0" is used as the lower side bit.

Hereinafter, Y<2i−1> used at the time of calculating the "i+1"th partial product is referred to as a carry multiplier.

Thus, for example, Y<3> is used as the lower side bit at the time of obtaining a third partial product besides being used at the time of obtaining the second partial product, as described above.

Next, a sign extension is described.

For example, in a data processor executing multiplication on the multiplier having three kinds of effective widths of 32 bits, 16 bits and 8 bits, in many cases, a multiplier having a maximum 32-bit width is used also in the operation of other sizes. In this case, for example, when executing the multiplication on the 8-bit multiplier, for obtaining a correct multiplication result, the higher 24 bits of a 32-bit multiplier input must be set to a specific value. At this time, a method of deciding the value of the higher 24 bits among the 32 bits when multiplier data is the signed binary numbers is called the sign extension method.

Since signed data is the object in the Booth algorithm, when the multiplier data is the unsigned binary numbers, the sign extension is effected after converting it (all invalid portions on the higher side of the effective width are made "0") into the signed data.

In the sign extension, the sign bits which are the highest bits of the effective data must be reproduced into all bits of higher invalid data.

FIG. 3 is a schematic view showing, as an example, a method of sign extension of 16-bit signed data to 32-bit signed data, and FIG. 4 is a schematic view showing a method of sign extension of 8-bit signed data to the 32-bit signed data.

In FIG. 3 and FIG. 4, the signed bit designated by reference character S is reproduced into all of the higher bits.

Specifically, as shown in FIG. 3, in case of extending the 16-bit signed data (effective data is 15 bits) to the 32-bit signed data, a value of the highest signed bit S of 16-bit signed data is reproduced into all 17 bits, including itself, at the higher side of the 32-bit data, and the lower 15 bits are the effective data.

Similarly, as shown in FIG. 4, in case of extending the 8-bit signed data (effective data is 7 bits) to the 32-bit signed data, a value of the highest signed bit S of the 8-bit signed data is reproduced into all 25 bits, including itself, at the higher side of the 32-bit data, and the lower 7 bits are the effective data.

Next, as an example of configuration of the hardware of the conventional multiplying circuit, by Booth algorithm, the case of including a sign extension function of the multiplier is described.

FIG. 5 is a block diagram showing an example of configuration of such conventional multiplying circuit.

FIG. 6 is a truth table for explaining the operation of a sign extension control circuit 50 constituting the multiplying circuit shown in FIG. 5.

In the conventional circuit configuration shown in FIG. 5, the 32 bits×32 bits multiplication is effected at a time. As multiplier sizes, three kinds of 32 bits (word), 16 bits (half word) and 8 bits (byte) are used.

In FIG. 5, numeral 1 designates a multiplier input Y<31:0> of 32-bit, numeral 2 designates a multiplicand input X<31:0> of 32-bit, numeral 3 designates a half word size signal, numeral 4 designates a byte size signal, numeral 50 designates a sign extension control circuit, numeral 60 designates a sign extension control signal and numerals 70a and 70b designate a sign extension lower circuit and a sign extension higher circuit.

The half-word size signal 8 showing that an effective portion of the multiplier Y is the half: word (Y<15:0>), and the byte size signal 4 showing that the effective portion of the multiplier Y is a byte (Y<7:0>) are both inputted to the sign extension control circuit 80, and Y<7> corresponding to the byte size sign bit in the multiplier input 1, and Y<15> corresponding to the half word size sign bit are also inputted to the sign extension control circuit 50.

The sign extension control signal 60 which is an output signal of the sign extension control circuit 50 is to be described later.

Numeral 8 designates sign extension multiplier signals (multiplier signals after sign extension) which are output signals from the sign extension lower circuit 70a and the sign extension higher circuit 70b, numerals 9a to 9p designate Booth decoders (BD) and numeral 1.0 designates a multiplication array circuit.

The Booth decoders 9a to 9p are so constituted that, the 3-bit input signal value as shown in FIG. 2, the corresponding 3-bit output signal value and the corresponding multiple generating circuit output are obtained.

The multiplication array circuit 10 includes multiple generating circuits 11a to 11p and partial product adding circuits (ADD) 12a to 12p.

Numeral 30 designates an output of multiplication result <63:1>.

The operation of such a conventional multiplying circuit is as follows.

As described above, the byte size signal 4 showing that the effective portion of the multiplier Y is <7:0>, the half word size signal 3 showing that the effective portion of the multiplier Y is the half word of Y<15:0>, the sign bit Y(7) which is the byte size in the multiplier Y of the multiplier input 1 and the sign bit Y<15> which is the half word are inputted to the sign extension control circuit 50, which outputs either "0" or bits Y<7> and Y<15> in response to the half word size signal 3 or byte size signal 4 as the sign extension control signal 60.

FIG. 6 shows the relationship between the input and output signals of the sign extension control circuit 50, in other words, the operation of the sign extension control circuit 50 is shown in the form of a truth table.

The sign extension control signal 60, which is the output signal of the sign extension control circuit 50, includes a higher half word set signal (SETHW), a higher half word reset signal (RSTHW), a second lower byte set signal (SETBT) and a second lower byte reset signal (RSTBT).

For example, at the time of multiplying byte size data, when the byte size signal 4 is "1" (the half-word size signal 3 is "0"), and Y<7> which is the sign bit S is "1", both the higher half word set signal (SETHW) and the second lower byte set signal (SETBT) become "1".

Also, at the time of multiplying half word size data, when the half word size signal 3 is "1" (the byte size signal 4 is "0") and Y<15> which is the sign bit S is "0", the higher half word reset signal (RSTHW) becomes "1".

The higher half word set signal (SETHW) and the higher half word reset signal (RSTHW) are inputted to the sign extension higher circuit 70b, and the second lower byte set signal (SETBT) and the second lower byte reset signal (RSTBT) are inputted to the sign extension lower circuit 70a.

While, the multiplier Y is inputted from the multiplier input 1, the higher half word Y<31:16> is inputted to the sign extension higher circuit 70b, and the second lower byte Y<15:8> is inputted to the sign extension lower circuit 70a. The other bits Y<7:0> are inputted to the Booth decoders 9a to 9d by each 2 bits.

In the sign extension higher circuit 70b, when the corresponding higher word set signal (SETHW) is "1", its output or all bits of SY<31:16> which is the sign extension multiplier signal 8 are forcibly made "1", and when the higher half word reset signal (RSTHW) is "1", its output or all bits of SY<31:16> which is the sign extension multiplier signal 8 are forcibly made "0".

When both the higher half word set signal (SETHW) and the higher half word reset signal (RSTHW) are "0", the input value of Y<31:16> is inputted intact to SY<31:16> which is the sign extension multiplier signal 8.

The signal extension lower circuit 70a also operates in the same way as the sign extension higher circuit 70b.

That is, in the sign extension lower circuit 70a, when the corresponding second lower byte set signal (SETBT) is "1" its output or all bits of SY<15:8> which is the sign extension multiplier signal 8 is forcibly made "1" and when the second lower byte reset signal (RSTBT) is "1", its output or all bits of SY<15:8> which is the sign extension multiplier signal 8 is forcibly made "0".

When both the second lower byte set signal (SETBT) and the second lower byte reset signal (RSTBT) are "0", the Y<15:8> input value is outputted intact to SY<15:8> which is the sign extension multiplier signal 8.

An example of specific circuit configuration by logic gates of the sign extension higher circuit 70b is shown in a circuit, diagram of FIG. 7.

The circuit shown in FIG. 7 is the circuit realizing functions of the sign extension higher circuit 70b as described above, and is constituted by one OR function and one AND function per one bit.

Specifically, each signal of the bits Y<16> to Y<31> is inputted to each one input, terminal of 2-input NOR gates 71, and the higher half word set signal (SETHW) is inputted to the other input terminal thereof. Each output signal of the NOR gates 71 is inputted to one input terminal of each 2-input AND gate 72, and the higher half word reset signal (RSTHW) is inputted to the other input terminal thereof. Each output signal of the AND gate 72 is the signal of the bits SY<16> to SY<31> of the sign extension multiplier signal 8.

The sign extension lower circuit 70a is also constituted similarly, and the input signals are the second lower byte set signal (SETBT) and second lower byte reset signal (RSTBT) in place of the higher half word set signal (SETHW) and higher half word reset signal (RSTHW), and signals of the bits Y<15> to Y<8> in place of the signals of the bits Y<31> to Y<16>.

The signals SY<31:16> in the sign extension multiplier signal 8 outputted from the sign extension lower circuit 70b are inputted to the Booth decoders 9i to 9p, the signals SY<15:8> in the sign extension multiplier signal 8 outputted from the sign extension lower circuit 70a are inputted to the Booth decoders 9e to 9h, and further, the signals Y<7:0> which are a portion of the multiplier input 1 are inputted to the Booth decoders 9a to 9d, and the decoding by the second degree Booth algorithm as shown in FIG. 2, is performed.

To the respective Booth decoders 9a to 9p, 3-bit multiplier data or the even bit corresponding to the multiplier input 1 and its higher and lower odd bits are inputted as shifting 2 bits in such a manner that, "0", Y<0> and Y<i> are inputted in the Booth decoder 9a, Y<1>, Y<2> and Y<3> to the Booth decoder 9b, Y<3>, Y<4> and Y<5> to the Booth decoder 9c and so on. And hence, the multipliers having odd order are inputted to the two adjacent Booth decoders. For example, the multiplier bit Y<7> is inputted to both the 4th Booth decoder 9d and the 5th Booth decoder 9e, and the multiplier bit SY<15> is inputted to both the 8th Booth decoder 9h and the 9th Booth decoder 9i.

A signal line through which the odd bit of the multiplier is inputted to the higher Booth decoder is defined as a carry multiplier signal line.

Outputs from the Booth decoders 9a to 9p are respectively inputted to the 1st multiple generating circuit 11a to 16th multiple generating circuit 11p, and in response to these inputs and the rules shown in FIG. 2, the respective multiple generating circuits 11a to 11p generate and output multiples of the multiplicand X corresponding to the values of Y<1:0>, Y<3:2>, Y<5:4>, Y<7:6>, SY<9:8> ... SY<31:30> and respective carry multiplier signals.

The multiplier outputs from the multiple generating circuits 11a to 11p are that, the multiple output from the multiple generating circuit 11a is outputted intact, as the multiplication result P<1:0> in the multiplication result output 30, and is inputted to the partial product adding circuit 12b, the other multiple outputs from the multiple generating circuit 11b to 11p are respectively inputted to the partial product adding circuits 12b to 12p. Outputs of the partial product adding circuits 12b to 12o are inputted to the partial product adding circuits 12c to 12p, wherein they are added.

The addition results by the partial product adding circuits 12b to 12p are outputted from the multiplication result output 30 as the 64-bit multiplication results P<63:0> to complete the multiplication.

Now, in the above description, though the case of extending the 16-bit signal data and the 8-bit signed data to the 32-bit signed data for multiplication has been described, the case of using 32-bit data is described in the following.

As already described, in the multiplying circuit using the Booth algorithm, though the integers by signed two's complement representation can be executed without pre-processing and post-processing, the unsigned integers can not be operated intact. And hence, in case of using the 32-bit data, it is extended by 1 bit width and is handled as the signed data.

FIG. 8A shows a sign extension necessary for handling 32-bit unsigned integer data as the 33-bit signed number. The sign extension at this time makes an extended bit 32 value "0".

In case of using the 32-bit signed data, as shown in FIG. 8B, a value of the sign bit which is the highest bit 31 is reproduced into the extended bit 32 and is processed as 33-bit singed data.

Since the multiplying circuit for 32 bits is required specially in case of multiplying the 32-bit signed data intact, it is to be understood that it is advantageous from the view point of hardwares to process also the 32-bit signed data after the sign extension to 33 bits in case of using the 32-bit unsigned integer data.

In such multiplication of 33 bits×33 bits, as shown in FIG. 9, 17 partial products are produced from the 1st to 17th partial products.

Now, in an array type multiplying circuit of 33 bits×33 bits for executing such multiplication in one processing, as apparent from FIG. 5, in general, 17 multiple generating circuits and 16 adding circuits are necessary. Thus when realizing the multiplying circuit on an IC chip as the hardware, a large area is occupied.

And hence, in the case where restriction on the occupied area on the IC chip is severe, the hardwares in which the multiplication is executed after time sharing it into a plural number of operation cycles are used.

The conventional multiplying circuit using such hardwares is described.

FIG. 10 is a block diagram showing an example of realizing such conventional multiplying circuit, and FIG. 11 is a detailed block diagram of a multiplication array circuit 10 which is a portion of the multiplying circuit shown in FIG. 10.

In the conventional example shown in FIG. 10, the hardwares which perform the 33 bits×33 bits multiplication in four times are shown. When the operation is executed by such hardwares in four times, the circuit scales of the multiple generating circuits and the adding circuits can be suppressed to about a quarter.

In FIG. 10 and FIG. 11, numeral 1 designates an inputs of a multiplier Y, numeral 2 designates an input of a multiplicand X, numeral 33 designates an initializing control input, numeral 34 designates an operation cycle control input, numeral 5 designates a multiplier dividing circuit, numeral 6 designates a multiplier carry latch, numerals 9a to 9d designate Booth decoders (BD), numeral 10 designates the multiplication array circuit, numerals 11a to 11d designate 1st to 4th multiple generating circuits, and numerals 12a to 12d designate partial product adding circuits (ADD).

In FIG. 11, numerals 13a to 13d designate 1st to 4th carry save type adders (CSA) constituting the partial product adding circuits 12a to 12d, numerals 14a to 14d designate 1st to 4th carry propagation type adders (CPA) constituting the partial product adders 12a to 12d, numeral 15 designates a higher CPA circuit, numeral 16 designates a highest multiple generating circuit, numeral 17 designates a highest partial product adding circuit, numeral 40 designates an intermediate result shift circuit, numeral 41 designates a carry shift circuit included in the intermediate result shift circuit 40, numeral 42 designates a sum shift circuit included in the intermediate result shift circuit 40, numeral 43 designates a CPA carry latch included in the intermediate result shift circuit 40, numeral 30 designates a lower output of the multiplication result Y and numeral 31 designates an higher output of the multiplication result Y.

In the circuit configuration shown in FIG. 10 and FIG. 11, different from the configuration shown in FIG. 5, effective data Y<31:0> in the multiplier input 1 is inputted to the multiplier dividing circuit 5 and divided into four portion by 8 bits, specifically, divided into Y<7:0>, Y<15:8>, Y<23:16> and Y<31:24>, which are respectively outputted successively from the multiplier dividing circuit 5 in time division.

To the Booth decoder 9a, an out, put of the multiplier carry latch 6, 1st and 2nd bit signals from the lower side output of the multiplier dividing circuit 5 are inputted, to the Booth divider 9b, 2nd, 3rd and 4th bit signals from the lower side output of the multiplier dividing circuit 5 are inputted, to the Booth decoder 9c, 4th, 5th and 6th bit signals from the lower side output of the multiplier dividing circuit 5 are inputted, and to the Booth decoder 9d, 6th, 7th and 8th bit signals from the lower side output of the multiplier dividing circuit 5 are inputted.

Outputs of the Booth decoders 9a to 9d are inputted to the multiple generating circuits 11a to 11d respectively. To the 1st partial product adding circuit 12a, outputs of the intermediate result shift circuit 40 and the multiple generating circuit 11a are inputted, to the partial product adding circuit 12b, outputs of the partial product adding circuit 12a and the multiple generating circuit 11b are inputted, to the partial product adding circuit 12c, outputs of the partial product adding circuit 12b and the multiple generating circuit 11c are inputted, and to the partial product adding circuit 12d, outputs of the partial product adding circuit 12c and the multiple generating circuit 11d are inputted.

The highest bit Y<32> of the multiplier input 1 is inputted directly to the highest multiple generating circuit 16, whose output is inputted to the highest partial product adding circuit 17 together with the output of the partial product adding circuit 12d.

An output of the highest partial product adding circuit 17 is inputted to the higher CPA circuit 15, whose output is the multiplication result higher output 31.

Next, the operation of the hardwares shown in FIG. 10 and FIG. 11 is described.

A multiplier Y<31:0> is inputted to the multiplier dividing circuit 5 from the multiplier input 1 in synchronism with the initializing control input 33. At first, the output Y<7:0>, which is the lower 8 bits of the multiplier Y, of the multiplier dividing circuit 5 as the 1st time output.

Simultaneously, the initializing control signal 33 resets the multiplier carry latch 6 and the intermediate result shift circuit 40.

By resetting the multiplier carry latch 6 and the intermediate result, shift circuit 40, "0" is outputted therefrom.

(1) Operation of 1st operation cycle

The first operation is started in synchronism with a rising transition of the operation cycle control input 34.

In the Y<7:0> outputted from the multiplier dividing circuit 5 and "0" outputted from the multiplier carry latch 6, the output of the multiplier carry latch 6 and Y<1:0> are inputted to the Booth decoder 9a, Y<3:1> is inputted to the Booth decoder 9b, Y<5:3> is inputted to the Booth decoder 9c and Y<7:6> is inputted to the Booth decoder 9d, and decoded by Booth algorithm.

The 1st, 2nd, 3rd and 4th multiplier generating circuits 11a to 11d respectively generate and output multiples of the multiplicand X corresponding to values of Y<1:0>, Y<3:2>, Y<5:4> and Y<7:6>, in response to the outputs from the respective Booth decoders 9a to 9b and the rules shown in FIG. 2.

The multiple outputs outputted from the multiple generating circuits 11a to 11d are inputted to and added in the carry save type adding circuits (CSA) 13a to 13d in the 1st to 4th adders 12a to 12d.

In the 1st CSA 13a, the output of the 1st multiple generating circuit 11a and an initial value "0" of the intermediate result shift circuit 40 are added, and the addition result is outputted in a set of carry (C) and sum (S). A portion of which corresponding to the lower 2 bits is inputted to the 1st CPA 14A, and a remaining portion is inputted to the 2nd CSA 11b close to the lower bit side.

Thereafter, in the same manner, from the 2nd CSA 13b to 4th CSA 13d, the multiplier outputs are added successively as shifting the digits by 2 bits. As the result of addition, the operation corresponding to Y<7:0>×X is executed.

Portions corresponding to the lower 2 bits of the outputs from the 1st CSA 13a to 4th CSA 14d in the operation result are inputted to the 1st CPA 14a to 4th CPA 14d, thereby the operation including a carry propagation is executed and the 8-bit addition result P<7:0> is outputted from the multiplication result lower output 30.

While, the higher portions of the operation result are outputted from the 4th CSA 13d in the form of a set of carry and sum, and inputted directly to the intermediate result shift circuit 40, wherein the carry output is latched by the carry shift circuit 41 and the sum output is latched by the sum shift circuit 42.

The carry output, of the 4th CPA 14d is saved in the CPA carry latch 43 in the intermediate result shift circuit 40, and the Y<7> value is saved in the multiplier carry latch 6.

Hereupon, the operation of saving the Y<7> value in the multiplier carry latch 6 is described.

As aforementioned, the 1st operation cycle starts in synchronism with the rising transition of the operation cycle control input 34, and the multiplier carry latch 6 outputs "0" latched at the time of initialization to give it to the Booth decoder 9a.

Now, the operation cycle control input 34 is connected to the multiplier carry latch 6 at its terminal T, and the highest output bit from the multiplier dividing circuit 5 is connected at its terminal D. Thus, the multiplier carry latch 6 outputs "0" in synchronism with the rising transition of the operation cycle control input 34, and latches Y<7> outputted from the multiplier dividing circuit 5.

The 1st operation cycle has been operated as described above.

In the 1st operation cycle, the highest multiplier generating circuit 16 to which the highest multiplier bit Y<32> is inputted and the highest partial product adding circuit 17 do not perform meaningful operations.

(2) Operation of 2nd operation cycle

Successively, the 2nd operation cycle is started in synchronism with changes in the operation cycle control signal 4.

In the 2nd operation cycle, Y<15:8> is outputted from the multiplier dividing circuit 5 as the 2nd output, Y<7> which was latched in the 1st operation cycle is outputted from the multiplier carry latch 6, and the higher operation result of the 1st operation cycle is outputted from the intermediate result shift circuit 40 in the form of a set of carry and sum.

Simultaneously, the multiplier carry latch 6 latches Y<15> outputted from the multiplier dividing circuit 5.

Also in the 2nd operation cycle, the multiplier is decoded and the multiples are generated in the same manner as in the 1st operation cycle, and the multiples are outputted from the multiple adding circuits 12a to 12d. The multiples generated in the 2nd operation cycle are the portions corresponding to Y<15:8>.

To the adding circuits 12a to 12d, in addition to the multiples obtained in the 2nd operation cycle, the higher result of the 1st operation cycle is also inputted from the intermediate result shift circuit 40 for addition. As the result of addition, a value excluding the lower 8 bits of Y<15:0>×X is obtained close to the lower bit side.

The lower 8 bits of the addition result are outputted to the multiplication result lower output 30 from the 1st CPA 14a to 4th CPA 14d as P<15:8>, and the higher bits are again inputted to the intermediate result shift, circuit 40 to complete the 2nd operation cycle.

Thereafter, the 3rd and 4th operation cycles are executed in the same manner, and P<23:16> and P<31:24> are outputted in order from the multiplication result lower output 30.

In the 4th operation cycle which is the final operation cycle, the higher bits outputted from the 4th CSA 13d are the value excluding lower 32 bits of Y<31:0>×X. For obtaining the multiplication result of 33 bits, the highest multiple corresponding to Y<32> must be added. For this purpose, the highest multiple generating circuit 16 and the highest partial product adding circuit 17 are provided.

Output of the 4th CSA 13d is inputted to the highest partial product adding circuit 17, wherein it is added to output of the highest multiple generating circuit 16 corresponding to Y<32>.

Since the operation result hitherto is obtained in the form of a set of carry and sum, the addition including the carry propagation is further executed in the higher CPA circuit 15, and the addition result is outputted to the multiplication result higher output 31.

FIG. 12 to FIG. 14 are views for particularly describing the carry shift circuit 41 which is a portion of the multiplication array shown in FIG. 11. FIG. 12 is a block diagram showing an example of configuration of the carry shift circuit 41, FIG. 13 is a truth table for explaining its operation and FIG. 14 is a circuit diagram showing an example of circuit configuration in case of realizing the carry shift circuit 41 by a MOS transistor circuit.

In FIG. 12, numeral 60 designates a D flip-flop with reset constituting the carry shift circuit 41, numeral 51 designates an inverter, numeral 52 designates a transmission gate, numeral 53 designates a MOS transistor and numeral 54 designates a NOR gate.

The carry shift circuit 41 is that, the initializing control input 33 is inputted to a reset terminal R, the carry intermediate result 24 is inputted to a data terminal D, the operation cycle control input 34 is inputted to a trigger terminal T, and a shift circuit output is outputted from an output terminal Q. Thus, the carry shift circuit 41 is reset by the initializing control input 33 and propagates the carry intermediate result 24 to the output in synchronism with the rising transition of the operation cycle control input 34.

These operation are summarized in the truth table shown in FIG. 13.

The D flip-flop with reset 60 which is an essential portion of the carry shift circuit 41 can be constituted as shown in FIG. 14, for example, by using a CMOS.

The sum shift, circuit 42 can also be constituted in the same way as the carry shift circuit 41.

How the multiplication shown in a schematic view of FIG. 9 is divided in the multiplying circuit shown in FIG. 10 is shown in schematic views of FIG. 15 and FIG. 16.

The 0th to 3rd partial products are added in the 1st operation cycle, the 4th to 7th partial products are added in the 2nd operation cycle, the 8th to 11th partial products are added in the 3rd operation cycle, and in the 4th operation cycle, in addition to the 12th to 15th partial products, the 16th partial product which is the highest partial product is added.

At this time, a higher value of the operation result of the previous cycle is added to the operation of the following cycle as the intermediate result. And, in the final 4th operation cycle, all of the partial products are added and the multiplication result is obtained.

Since the conventional multiplying circuit is constituted as described above, gates for realizing an OR function and an AND function for every bits are required in the sign extension circuit, thus, for example, in case of constituting such a multiplying circuit on a chip as a portion of a computer, a very large occupied area of the chip is required due to transistors for realizing the gates, results in a problem of chip utilization efficiency.

In the configuration producing the remainder in division of the multiplier bits as in case of dividing the 33 bits×33 bits multiplication into 4 operation cycles shown as the conventional example, an extra multiple generating circuit and adding circuit are required for adding the partial product of the remained bits.

It is believed that, numerals used in a digital processor or in a microprocessor and the like are usually in a bit width of two's power number such as 8, 16 and 32 bits, so that the division can be performed without remainders. However, in case of using unsigned binary numbers in the multiplying circuit utilizing the Booth algorithm, since the bit width of the multiplier inputted to the multiplying circuit must be extended by 1 bit from the original bit width, it is necessary to add a circuit for adding the partial product for the 1 bit extension portion, enlarging the circuit scale.

SUMMARY OF THE INVENTION

The present invention has been devised in view of such circumstances, therefore, it is a first object thereof to provide a multiplying circuit, in which a chip area can be utilized efficiently by realizing a sign extension function with a smaller circuit scale than tile conventional.

It is a second object of the present invention to provide a multiplying circuit, in which enlargement of the circuit scale can be suppressed by decreasing the number of additional adding circuits, in case of producing remainders in the number of partial products at the time of executing the multiplication by dividing it into a plurality of operation cycles. Particularly, when the remainder of the number of partial products due to the operation cycle division of the multiplication is 1, the adding circuit which was required in the past is disused.

A first invention of the multiplying circuit according to the present invention comprises, a circuit, wherein all bits of a multiplier subjected to a sign extension are set to a certain specific value, and in case of producing carry in the sign bit which is the highest bit of effective data in data to be multiplied, a specific value signal is inputted to an input portion of a Booth decoder of tile bit according to a sign extension control signal value.

In such first invention of the multiplying circuit according to the present invention, when the sign bit produces the carry, since a value same as the value set in the bit of an invalid portion of the multiplier is inputted to the Booth decoder, a correct operation result is obtained.

A second invention of the multiplying circuit according to the present invention is constituted such that, a value inputted to a partial product adding circuit from an intermediate result shift circuit, is set to a value of a multiplicand according to a partial bit value of the multiplier, and the multiplier bits excluding the partial bits inputted to the intermediate result shift circuit are inputted to the multiple generating circuits.

In such second invention of the multiplying circuit according to the present invention, since the partial products corresponding to the lower bits of the multiplier are loaded to the intermediate :result shift circuit at the time of starting the operation, and inputted to the adding circuits in the 1st operation cycle, the partial products are produced without using the multiple generating circuits, and thereafter, the partial products are obtained successively in the same way as in the past.

The above and further objects and features of the invention will more fully be apparent from the following detailed description with accompanying drawings.

BRIEF DESCRIPTION OF THE DRAWINGS

FIG. 2 is a schematic view showing a method of multiplication by Booth algorithm conventionally used in general, FIG. 6 is a truth table for explaining the operation of a sign extension control circuit constituting a multiplying circuit shown in FIG. 5, FIG. 8A is a schematic view showing a sign extension necessary for handling 32-bit unsigned integer data as 33-bit singed numbers, FIG. 8B is a schematic view showing a sign extension necessary for handling 32-bit unsigned integer data as 33-bit signed numbers, FIG. 13 is a truth table for explaining its operation, FIG. 18 is a truth table showing the operation of a sign extension control circuit which is a portion of a multiplying circuit shown in FIG. 17, FIG. 25 is a truth table for explaining the operation of a carry shift circuit.

DESCRIPTION OF THE PREFERRED EMBODIMENTS

At first, a first invention of a multiplying circuit according to the present invention is described.

Figure 17:
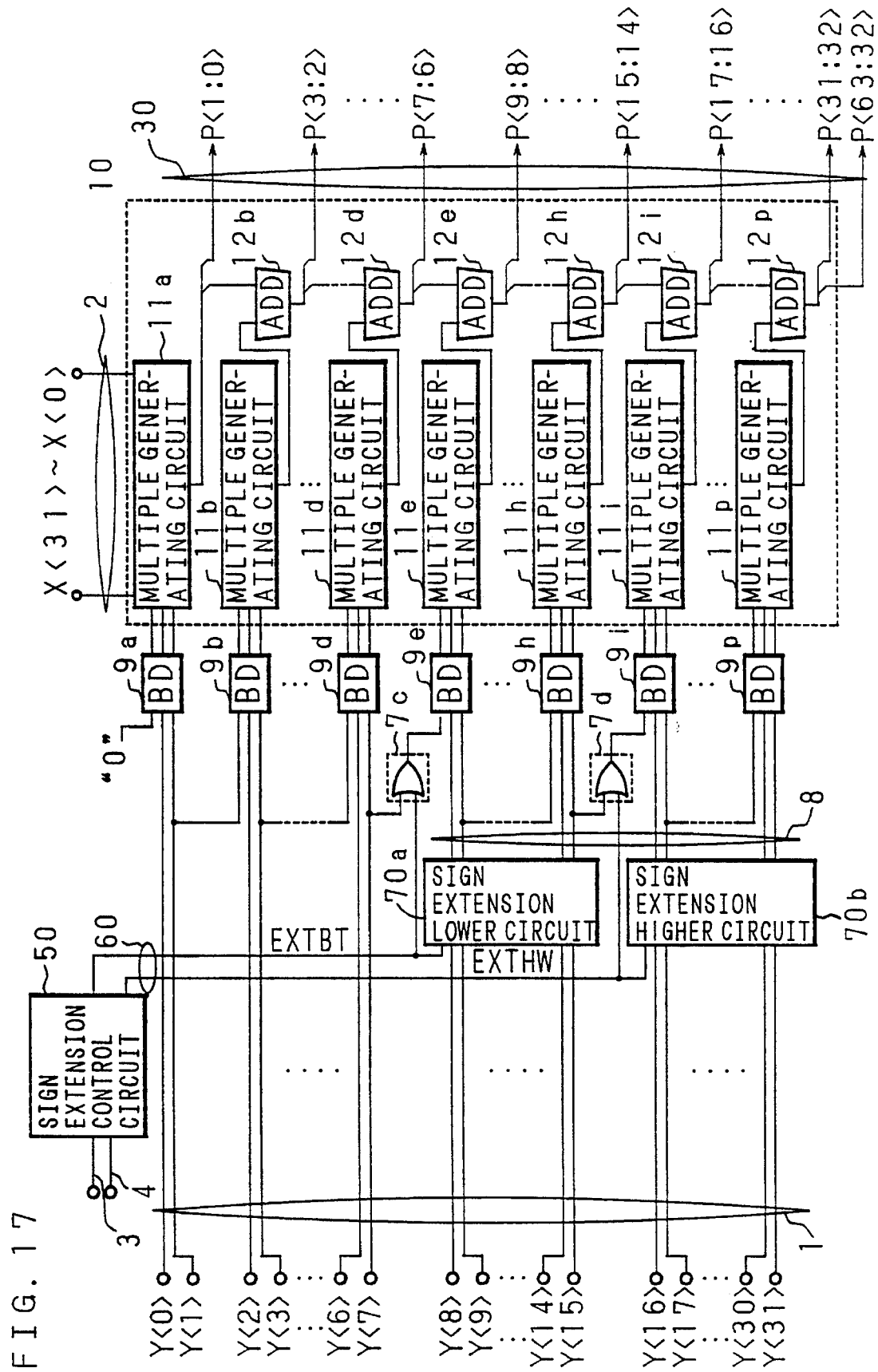
FIG. 17 is a block diagram showing an example of configuration of a first invention of a multiplying circuit according to the present invention.

FIG. 17 is a block diagram showing an example of configuration of an embodiment of a first invention of a multiplying circuit according to the present invention.

FIG. 18 is a truth table showing the operation of a sign extension control circuit which is a portion of the multiplying circuit shown in FIG. 17.

In FIG. 17, the same reference characters designate corresponding parts in respective drawings used for the aforementioned conventional description.

In the circuit configuration shown in FIG. 17, the 32 bits×32 bits multiplication is performed at a time. As multiplier sizes, three kinds of 32 bits (word), 16 bits (half word) and 8 bits (byte) are used.

In FIG. 17, numeral 1 designates an input of the 32-bit multiplier Y<31:0>, numeral 2 designates an input, of 32-bit multiplicand X<31:0>, numeral 3 designates a half word size signal, numeral 4 designates a byte size signal, numeral 50 designates a sign extension control circuit, numeral 60 designates a sign extension control signal, numerals 70a and 70b designate a sign extension lower circuit and a sign extension higher circuit.

The half word size signal 3 showing that an effective portion of the multiplier Y is a half word of Y<15:0>, and the byte size signal 4 showing that the effective portion of the multiplier Y is Y<7:0> are inputted to the sign extension control circuit 50.

The sign extension control signal 60 which is an output signal of the sign extension control circuit 50 is 2 bits as to be described later, and each bit of which is inputted to the sign extension lower circuit 70a and the sign extension higher circuit 70b.

Numeral 8 designates sign extension multiplier signals (the multiplier signals after sign extension) which are output signals from the sign extension lower circuit, 70a and sign extension higher circuit 70b, numerals 9a to 9p designate Booth decoders (BD) and numeral 10 designates a multiplication array circuit.

The multiplication array circuit 10 includes multiple generating circuits 11a to 11p and partial product adding circuit (ADD) 12a to 12p.

Numeral 30 designates an output of multiplication results P<63:1>.

Figure 1:
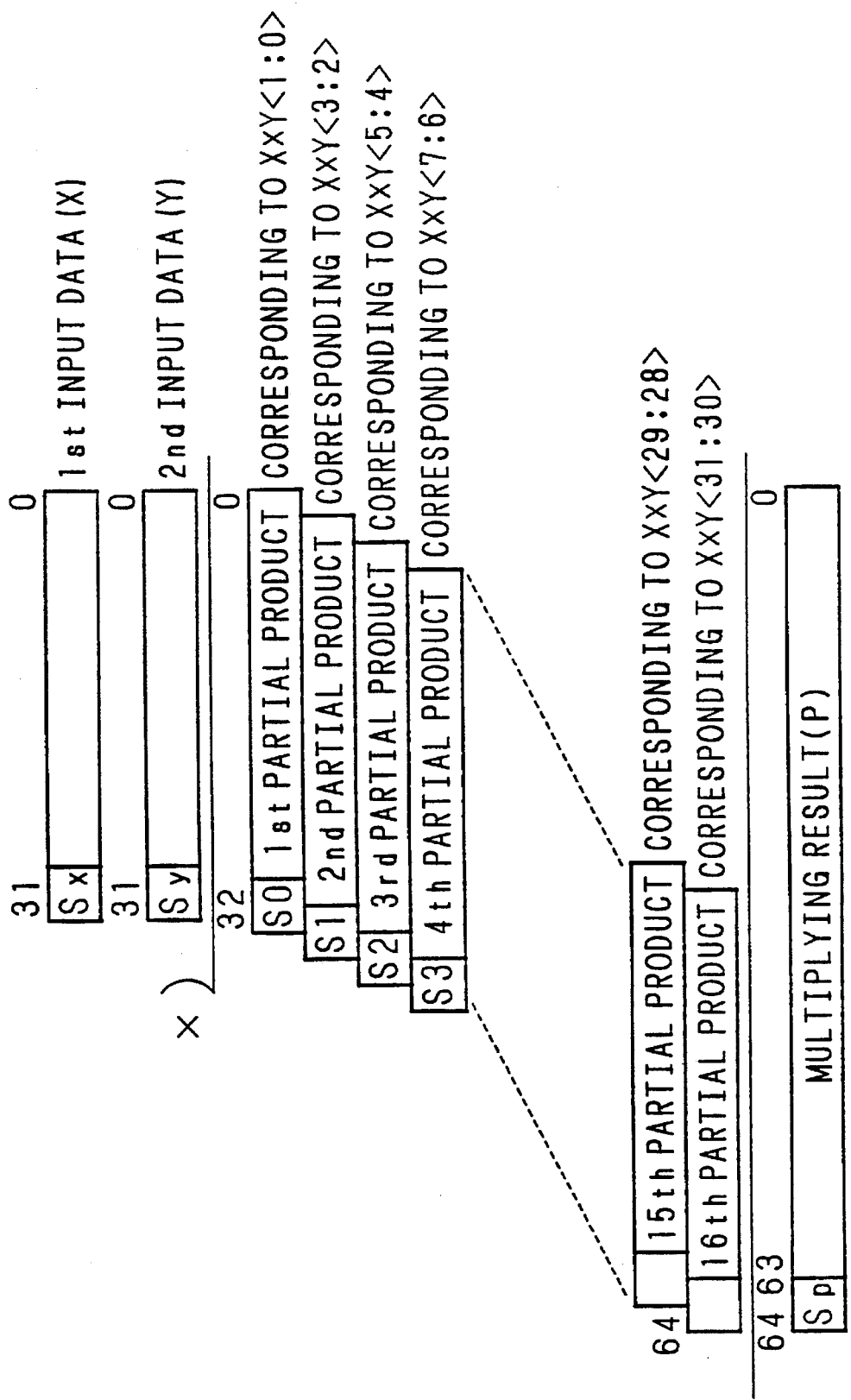
FIG. 1 is a schematic view showing a method of multiplication by Booth algorithm conventionally used in general.
Figure 3:
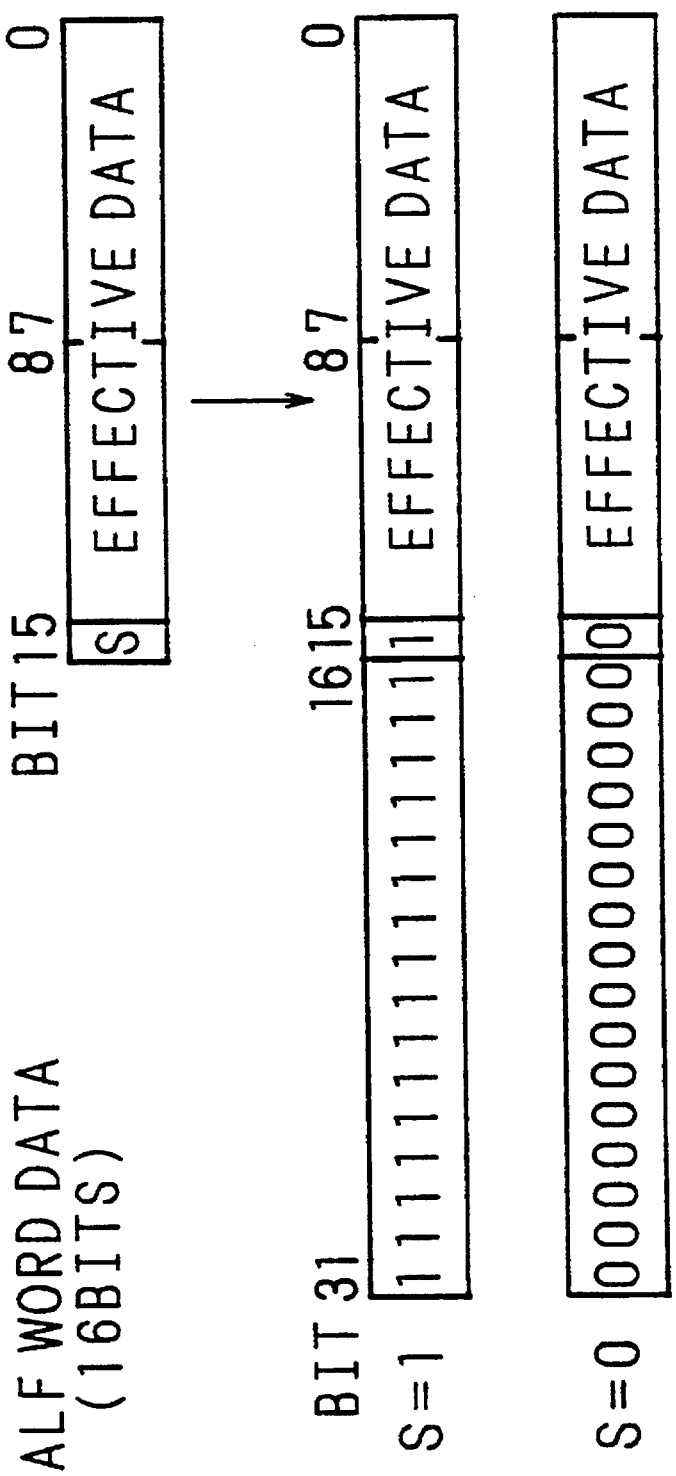
FIG. 3 is a schematic view showing a method of sign extension of 16-bit signed data into 32-bit signed data.
Figure 4:
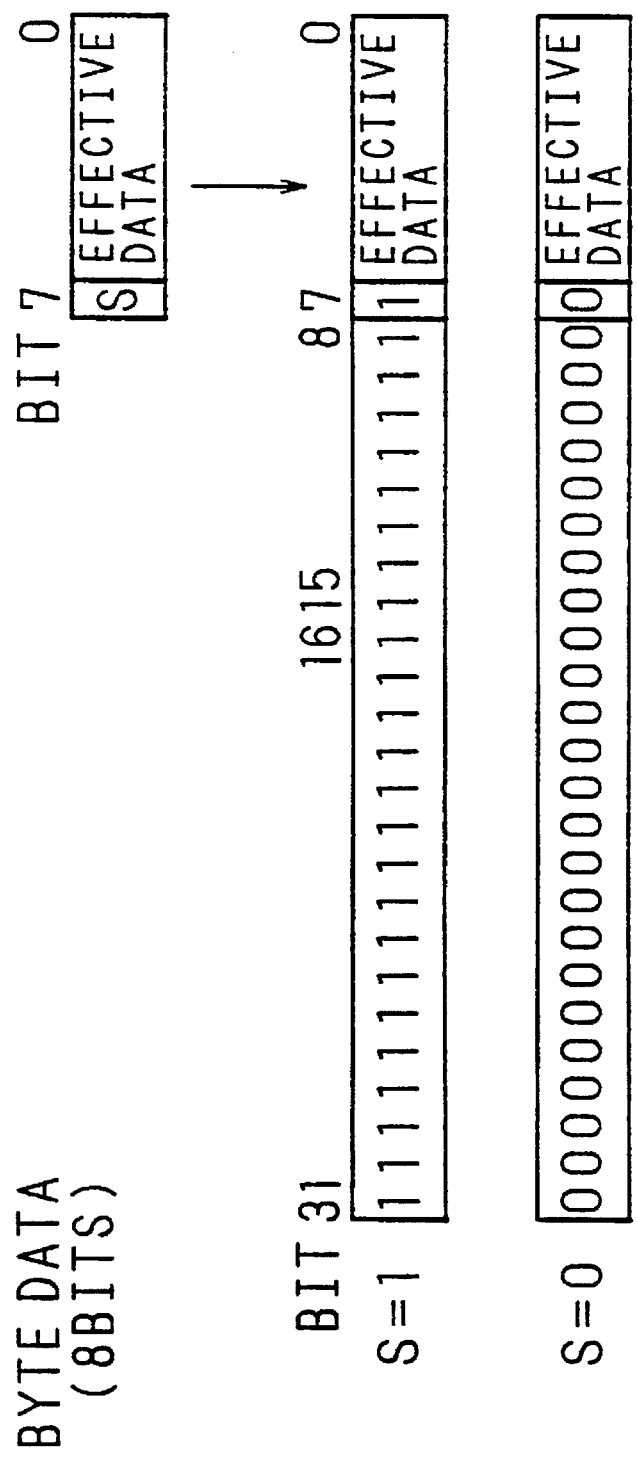
FIG. 4 is a schematic view showing a method of sign extension of 8-bit signed data into 32-bit signed data.
Figure 5:
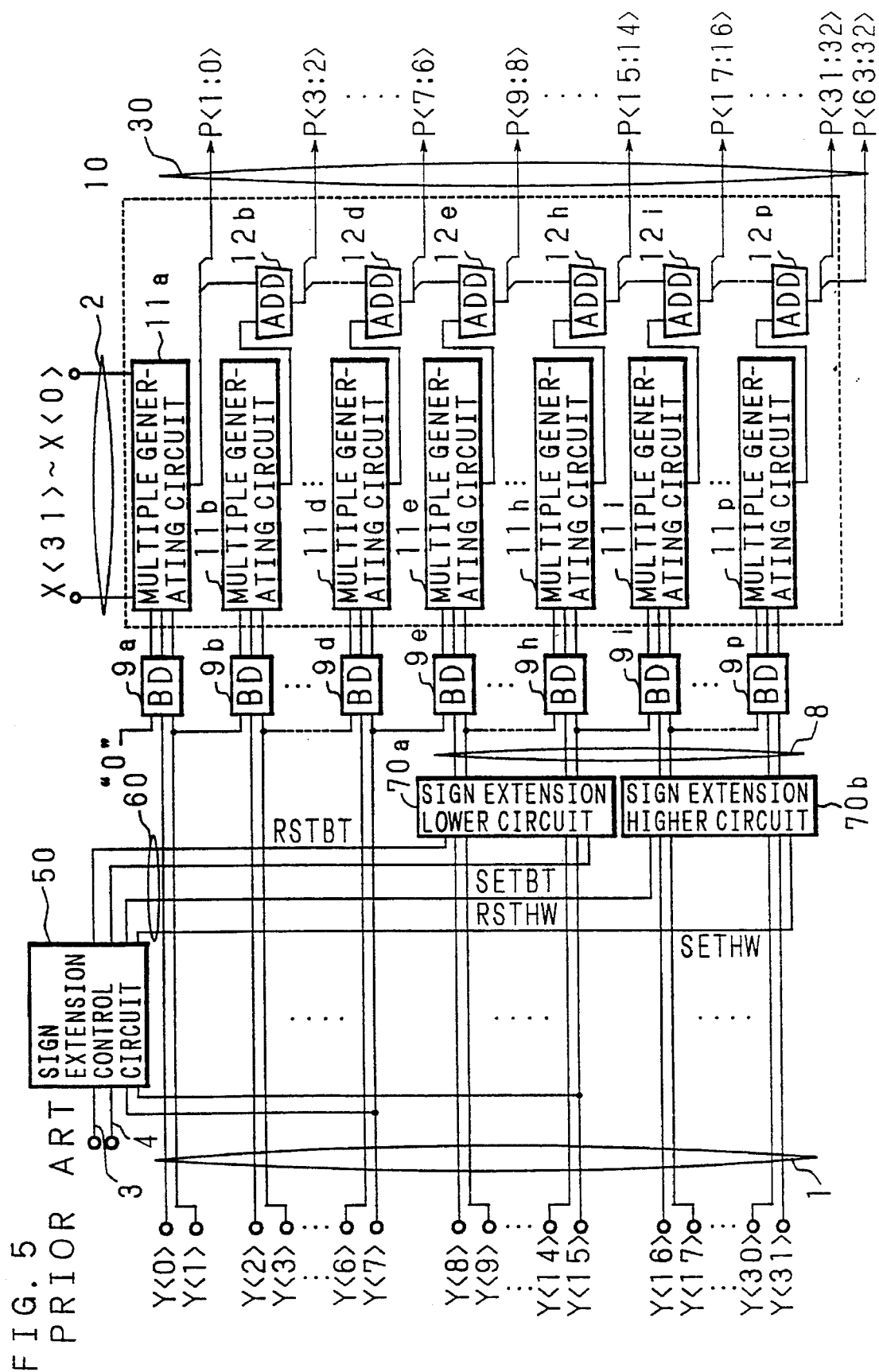
FIG. 5 is a block diagram showing an example of configuration of a conventional multiplying circuit.
Figure 7:
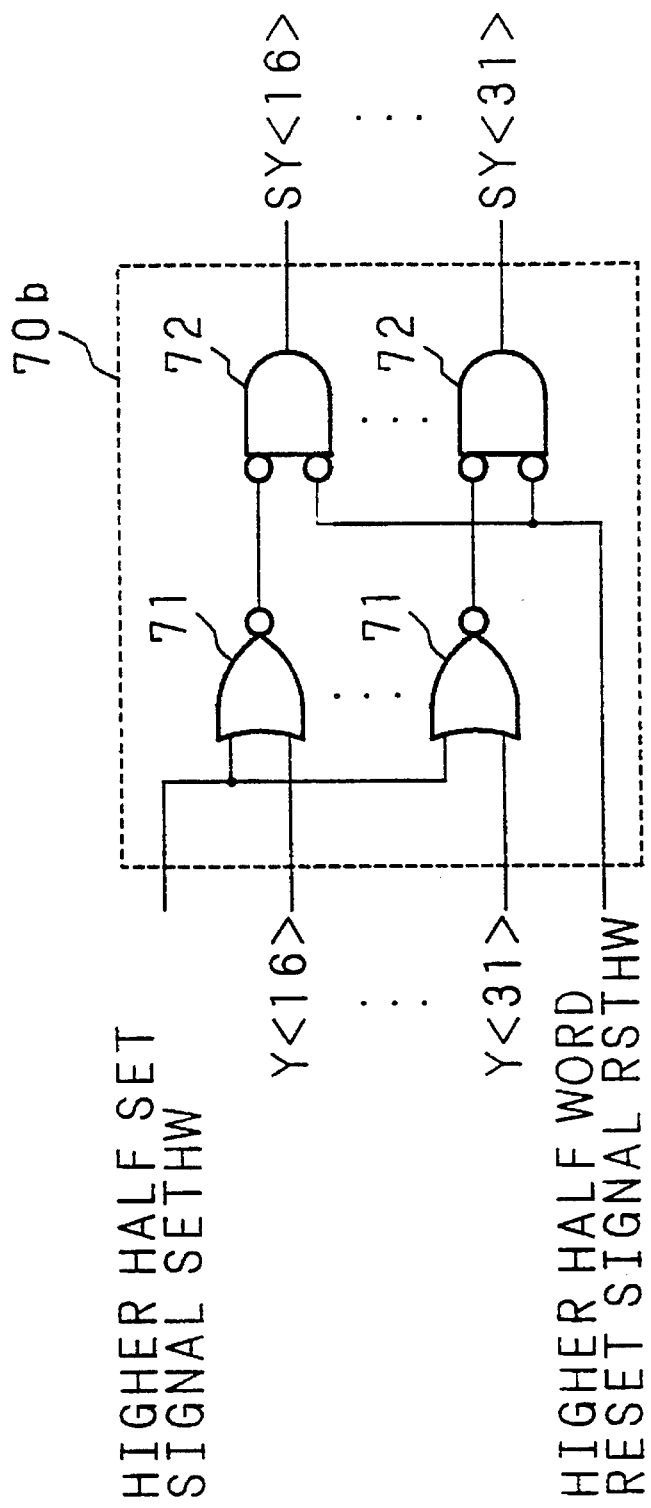
FIG. 7 is a circuit diagram showing an example of specific circuit configuration by logic gates of a sign extension higher circuit constituting a multiplying circuit shown in FIG. 5.
Figure 9:
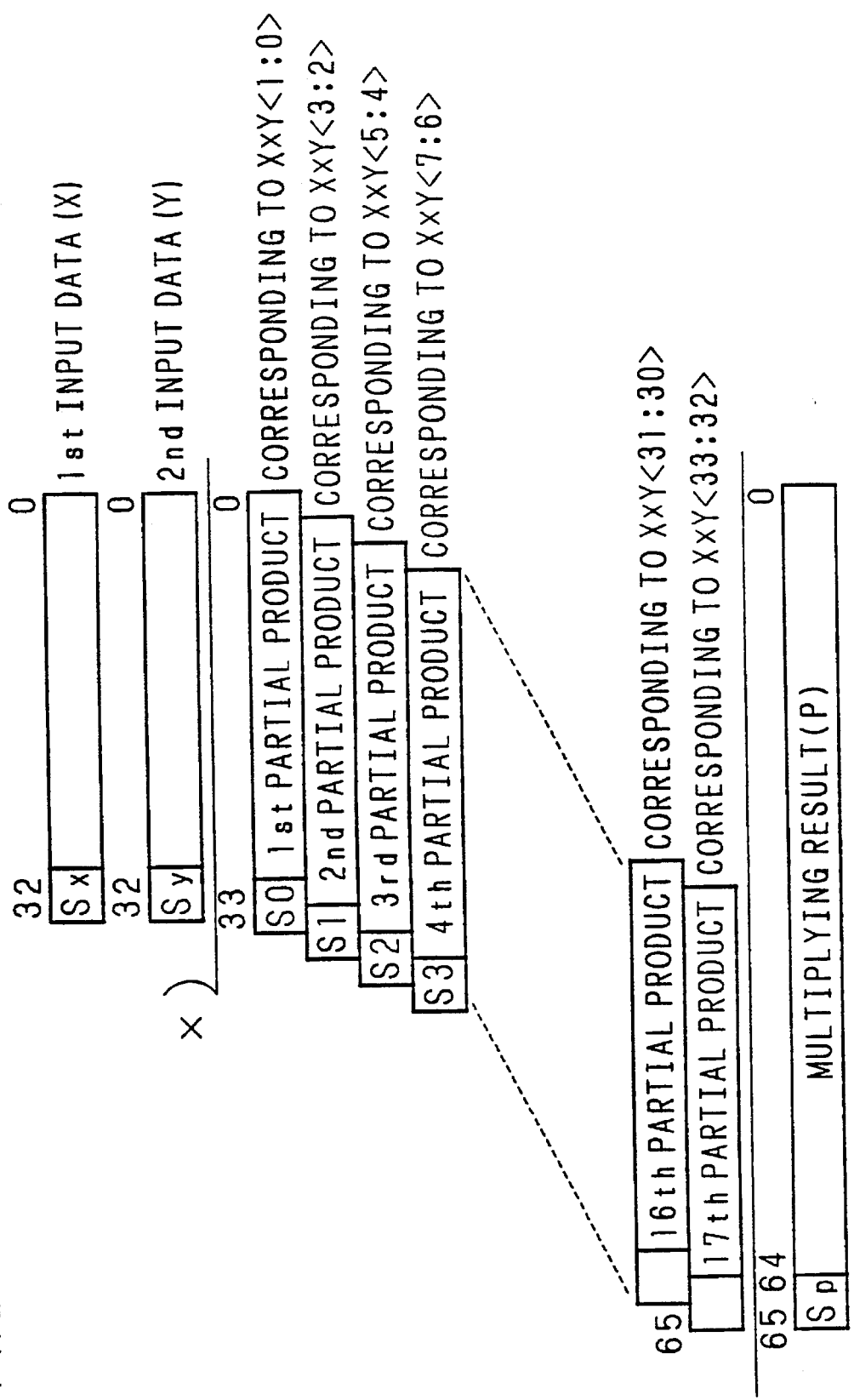
FIG. 9 is a schematic view showing partial products produced in 33 bits×33 bits multiplication.

Though the above-mentioned configuration is same as the conventional configuration shown in FIG. 5, in the first invention of the multiplying circuit shown in FIG. 17, sign carry correcting circuits 7c and 7d are further included.

Specifically, the sign carry correcting circuits 7c and 7d are both constituted by 2-input OR gates.

To the sign carry correcting circuit 7c, Y<7> among the multiplier input 1 and a 2nd lower byte extension signal (EXTBT) in the sign extension control signal 60 which is the output of the sign extension control circuit 50 are inputted, and its output is inputted to the Booth decoder 9e.

To the sign carry correcting circuit 7d, SY<15> among the sign extension multiplier signals 8 and a higher half word extension signal (EXTHW) in the sign extension control signal 60 which is the output of the sign extension control circuit 50 to be described later are inputted.

In the following, the operation of the first invention of the multiplying circuit of the present invention is described mainly on the points different from those of the aforementioned conventional example.

As mentioned above, the byte size signal 4 showing that the effective portion of the multiplier is Y<7:0>, and the half word size signal 3 showing that the effective portion of the multiplier Y is Y<15:0> are inputted to the sign extension control circuit 50. The sign extension control circuit 50 outputs the sign extension control signal 60 as shown in the truth table of FIG. 18 in response to the two inputs.

FIG. 18 shows the relationship between the input and output signals of the sign extension control circuit 50, in other words, the operation of the sign extension control circuit 50 in the form of the truth table.

In the sign extension control signal 60 which is the output signal of the sign extension control circuit 50, the higher half word extension signal (EXTHW) and the 2nd lower byte extension signal (EXTBT) are included.

For example, at the time of multiplying byte size data, since the byte size signal 4 is "1" (the half word size signal 3 is "0"), both the higher half word extension signal (EXTHW) and the 2nd lower byte extension signal (EXTBT) become "1". At the time of multiplying half word size data, since the half word size signal 3 is "1" (the byte size signal 4 is "0"), only the higher half word extension signal (EXTHW) becomes "1".

The higher half word extension signal (EXTHW) is inputted to the sign extension higher circuit 70b, and the 2nd lower byte extension signal (EXTBT) is inputted to the sign extension lower circuit 70a.

While, the multiplier Y is inputted from the multiplier input 1, wherein Y<31:16> which are the higher half word are inputted to the sign extension higher circuit 70b, and Y<15:8> which are the 2nd lower byte are inputted to the sign extension lower circuit 70a. Other bits Y<7:0> are directly inputted to the multiple generating circuits 11a to 11d 2 bits by 2 bits.

In the sign extension higher circuit 70b, when the corresponding higher half word extension signal (EXTHW) is "1", its output or all bits of SY<31:16> which are the sign extension multiplier signals 8 are forcibly made "1", and when the higher half word extension signal (EXTHW) is "0", the Y<31:16> input values are outputted intact to the SY<31:16> output 8.

Similarly, in the sign extension lower circuit 70a, according to the 2nd lower byte extension signal (EXTBT), that is, when the 2nd lower byte extension signal (EXTBT) is "1", all bits of SY<15:8> which are the sign extension multiplier signals 8 are forcibly made "1", and when the 2nd lower byte extension signal (EXTBT) is "0", the Y<15:8> input values are outputted intact to the SY<15:8> which are the outputs of the sign extension multiple signals 8.

Figure 19:
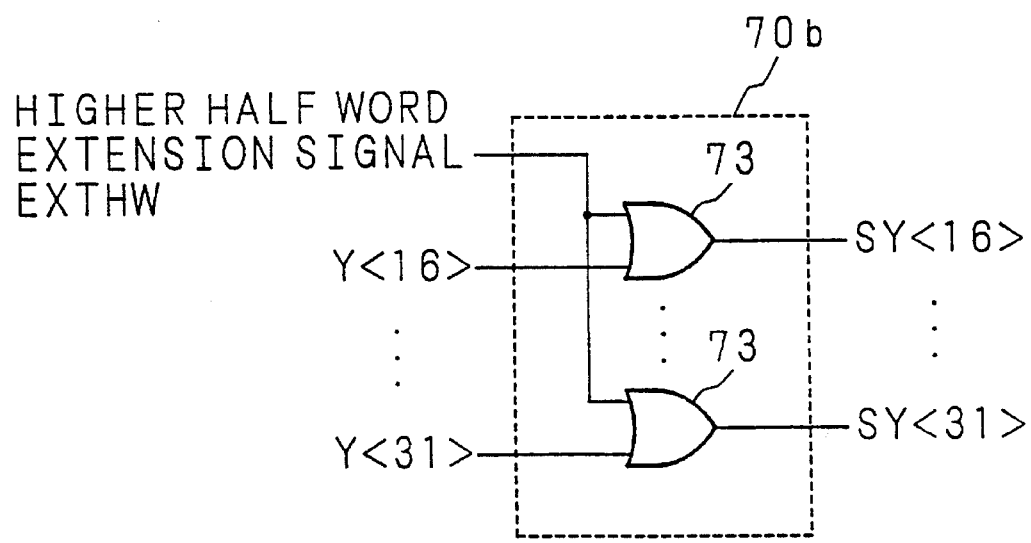
FIG. 19 is a circuit diagram showing a configuration in case of constituting a sign extension lower circuit and a sign extension higher circuit by logic gates.

FIG. 19 shows a circuit diagram in case of constituting the sign extension lower circuit 70a and the sign extension higher circuit 70b by logic gates.

The circuit shown in FIG. 19 is the circuit realizing the aforementioned functions, and is constituted by one OR function per each bit.

Specifically, respective signals of the bits Y<16> to Y<31> are inputted to one input terminal of the OR gates 73 of two inputs, and the higher half word extension signal (EXTHW) is inputted to the other input terminal thereof. Output signals of the OR gates 73 are the signals of the bits SY<16> to SY<31> of the sign extension multiplier signals 8.

The sign extension lower circuit 70a is also constituted similarly, the input signals are the 2nd lower byte extension signal (EXTBT) in place of the higher half word extension signal (EXTHW), and the Y<15> to Y<8> signals in place of the bits Y<31> to Y<16> signals.

The SY<31:16> among the sign extension multiplier signals 8 outputted from tile sign extension lower circuit 70b are inputted to tile Booth decoders 9i to 9p, the SY<15:8> among the sign extension multiple signals 8 outputted From the sign extension lower circuit 70a are inputted to the Booth decoders 9e to 9h, and the Y<7:0> which is a portion of the multiplier input 1 are inputted to the Booth decoders 9a to 9d for being decoded by the second degree Booth algorithm.

At this time, the SY<15> signal which is to be a sign bit of half word data is inputted intact to the 8th Booth decoder 9h. However, since the sign carry correcting circuit 7d is inserted between the SY<15> signal and the carry multiplier of the 9th Booth decoder 9i, when tile higher half word extension signal (EXTHW) is "1", which is inputted to the 9th Booth decoder 9i irrespective of the SY<15> signal value.

The sign carry correcting circuit 7c is also inserted between the bit Y<7> and the 5th Booth decoder 9e, thus either Y<7> or "1" is outputted responsive to the 2nd lower byte extension signal (EXTBT).

The Booth decodes 9a to 9p execute decoding according to these input values.

Outputs from the Booth decoders 9a to 9p are inputted to the 1st multiple generating circuit 11a to 16th multiple generating circuit 11p, and on basis of these inputs and rules shown in FIG. 2, the respective multiple generating circuits 11a to 11p generate and output multiples of the multiplicand X, corresponding to values and respective carry multiplier signals of the Y<1:0>, Y<3:2>, Y<5:4>, Y<7:6>, SY<9 8> . . . SY<31:30>.

The multiple outputs from the multiple generating circuits 11a to 11p are that, the multiple output from the multiple generating circuit 11a is outputted intact as P<1:0> among the multiplication result output 30 and is inputted to the partial product adding circuit 12b, and the multiple outputs from the remaining multiple generating circuits 11b to 11p are respectively inputted to the partial product adding circuits 12b to 12p, to the partial product adding circuits 12c to 12p, outputs of the partial product adding circuits 12b to 12o are inputted and the each of the partial product adding circuit 12b to 12p add those two inputs.

At this time, the multiple generating circuits 11a to 11p, against multiple bit strings, as shown in the truth table of FIG. 2, output the partial products of the same value for the bit strings "000" and "111". And hence, when the sign bit is "0" and the higher bits are to be originally extended entirely to "0", there is no difference in the resulting partial products even when extended to "1" as this embodiment.

However, in the Booth decoder wherein the sign bit "0" is carried and inputted together with an extended portion "1" as the multiplier input, since "110" is to be inputted, the result, differs from the case of input of "000".

In the example shown in the embodiment, this problem occurs in the 5th Booth decoder 9e in case of byte size, and in the 9th Booth decoder 9i in case of half word size.

For the purpose of correction, in the first invention of the multiplying circuit of the present invention, the sign carry correcting circuits 7c and 7d are provided. That is, at the time of performing the sign extension, the carry multiplier signal corresponding to the sign bit is forcibly set to "1" by the sign carry correcting circuits 7c and 7d, and since "111" is inputted to the Booth decoder, as the result, the same value as the case of "0" extension is generated.

Figure 20:
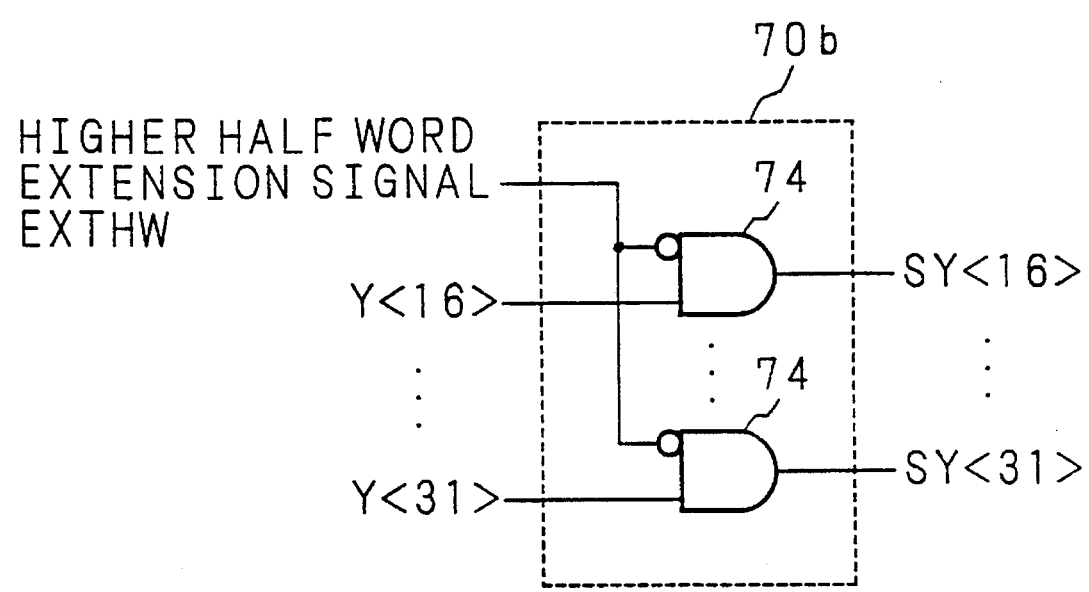
FIG. 20 is a circuit diagram showing an example of another configuration in case of constituting a sign extension lower circuit and a sign extension higher circuit by logic gates.
Figure 21:
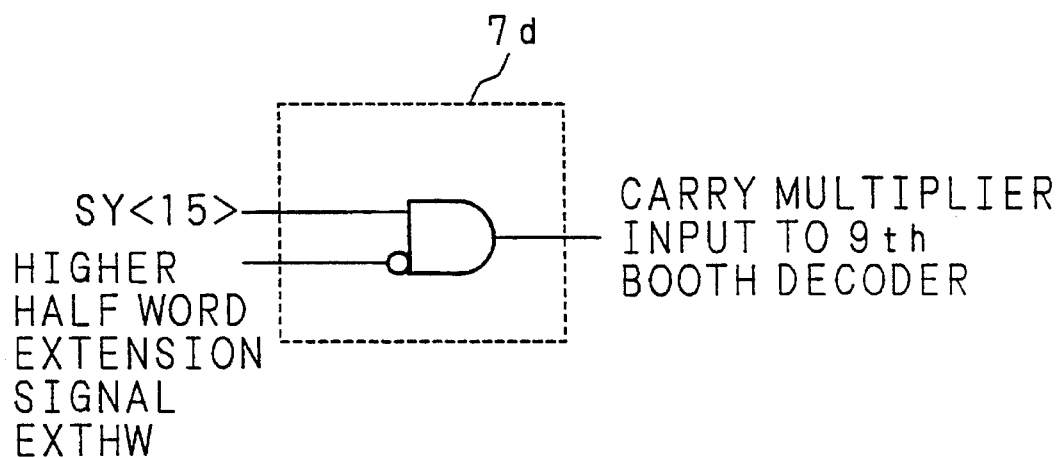
FIG. 21 is a circuit diagram showing an example of another configuration of a sign carry correcting circuit.

In the above-mentioned embodiment, though the configuration in which the multiplier is always extended by "1" at the time of sign extension is shown, it is also possible to constitute such that the sign extension is always performed at "0". In that case, the sign extension circuit is realized by one AND function per bit as shown in FIG. 20, and as shown in FIG. 21, the sign carry correcting circuits 7c and 7d can be realized by the AND function.

In the above-mentioned embodiment, though an example of multiplying circuit using the second degree Booth algorithm is shown, the present invention is also applicable in the multiplying circuit using the Booth algorithm of other degrees.

Next, a second invention of the multiplying circuit according to the present invention is described.

Figure 22:
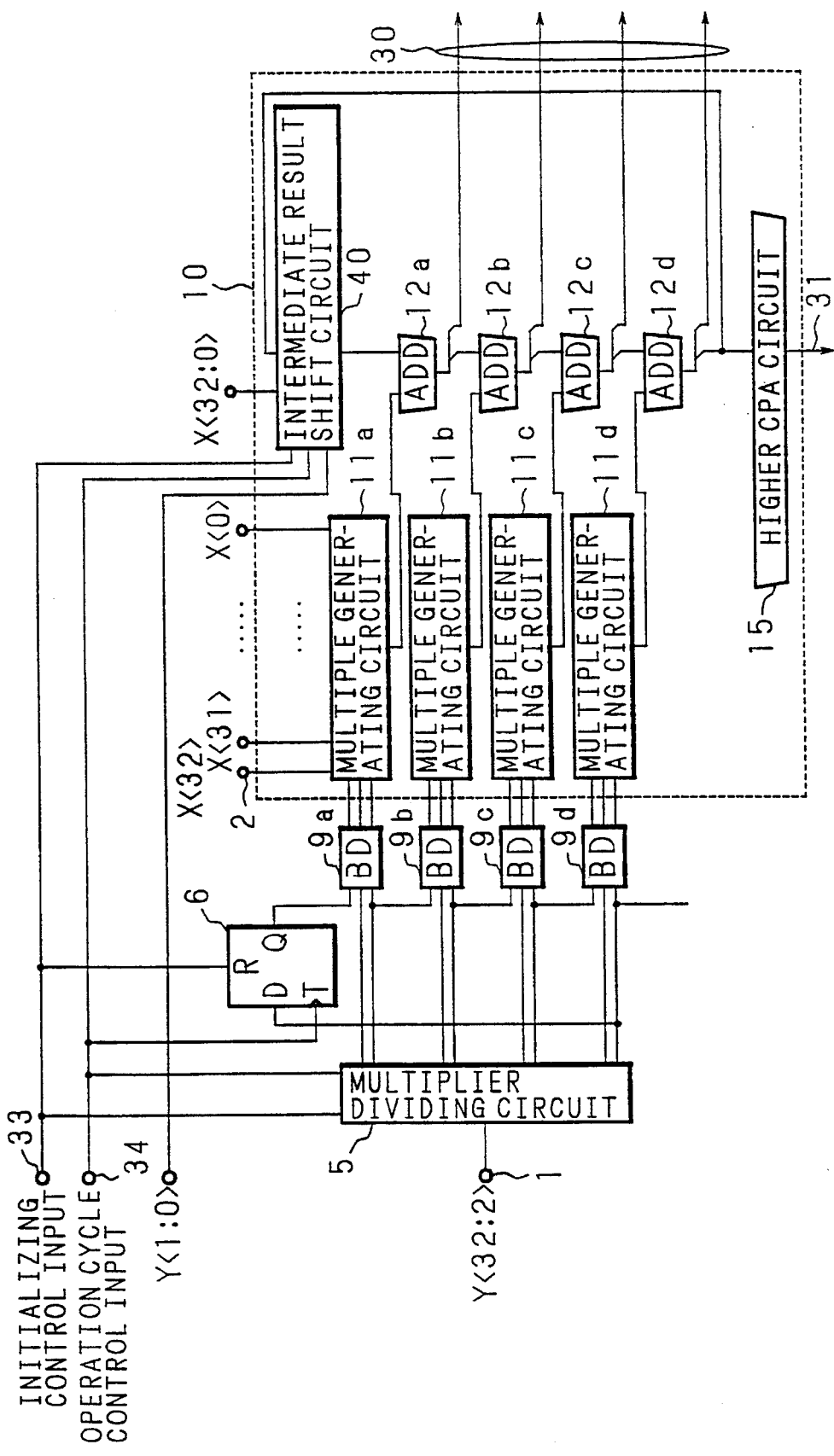
FIG. 22 is a block diagram showing an example of configuration of an embodiment of a second invention of a multiplying circuit of the present invention.
Figure 23:
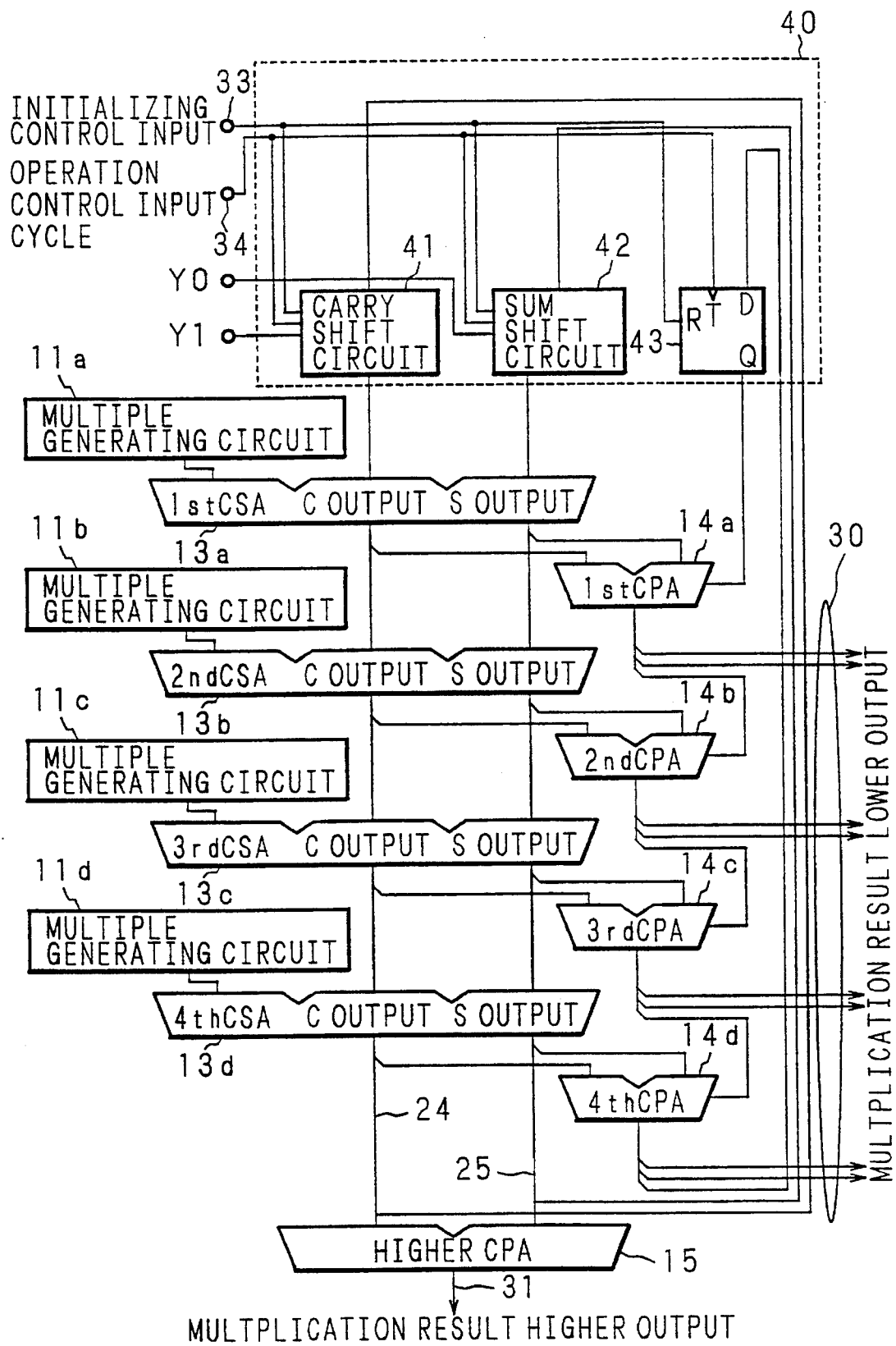
FIG. 23 is a block diagram showing a detailed configuration of a multiplication array circuit constituting a multiplying circuit shown in FIG. 22.

FIG. 22 is a block diagram showing an example of configuration of an embodiment of the second invention of the multiplying circuit according to the present invention, and FIG. 23 is a block diagram showing a detailed configuration of the multiplication array circuit 10 constituting the multiplying circuit shown in FIG. 22.

Figure 10:
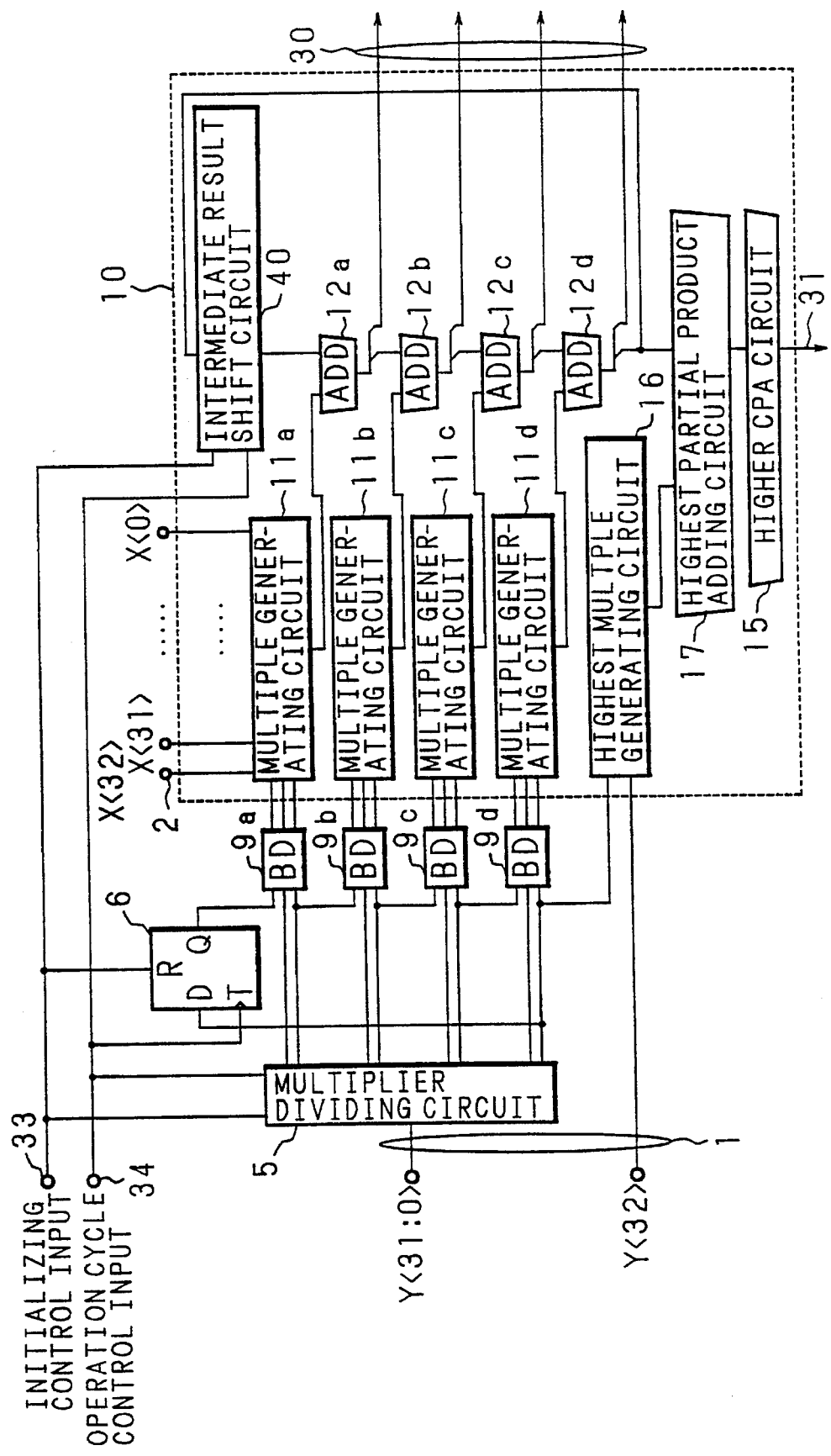
FIG. 10 is a block diagram showing an example of realizing a conventional multiplying circuit.
Figure 11:
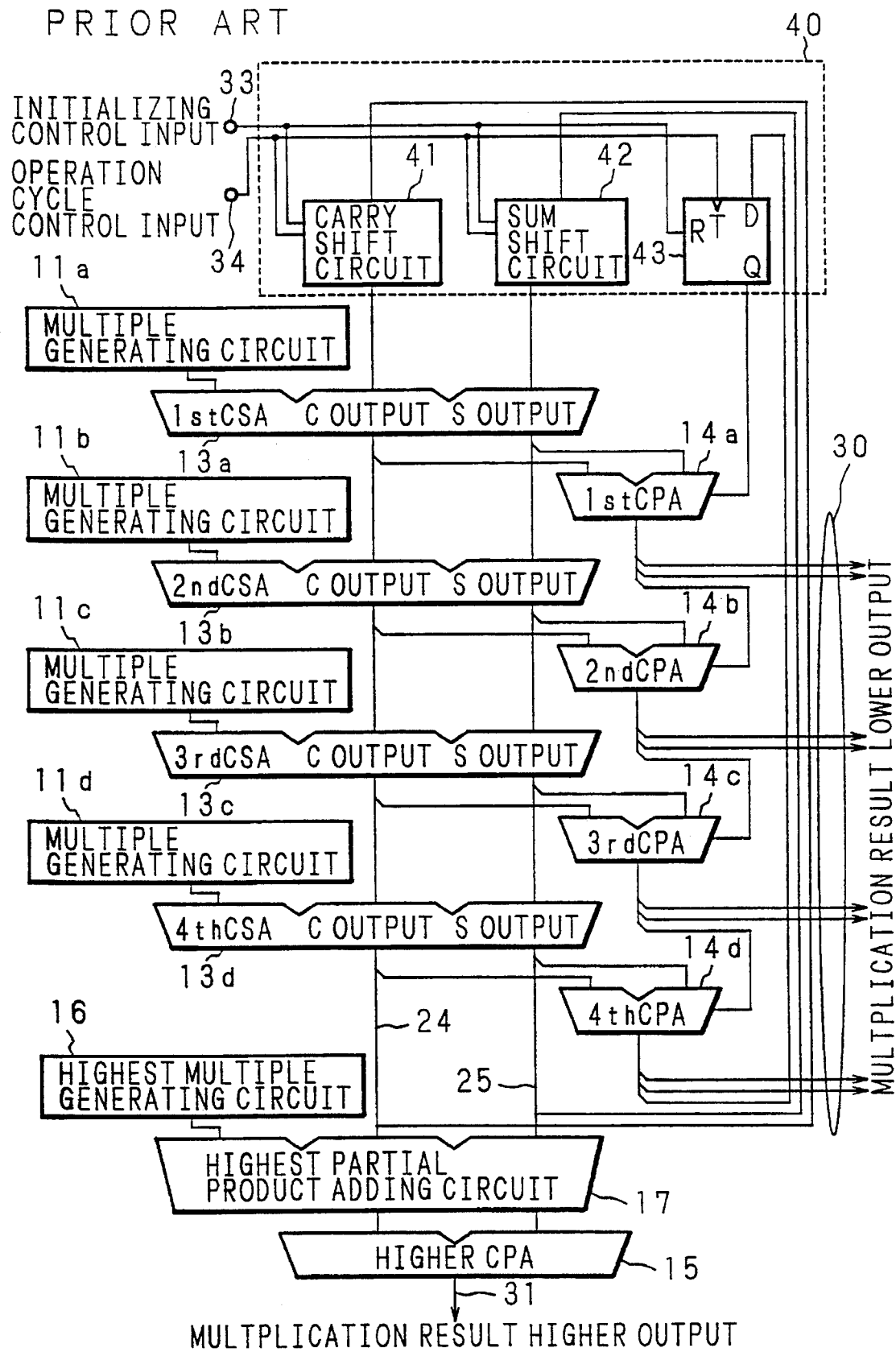
FIG. 11 is a block diagram particularly showing a multiplication array circuit constituting a conventional multiplying circuit.
Figure 12:
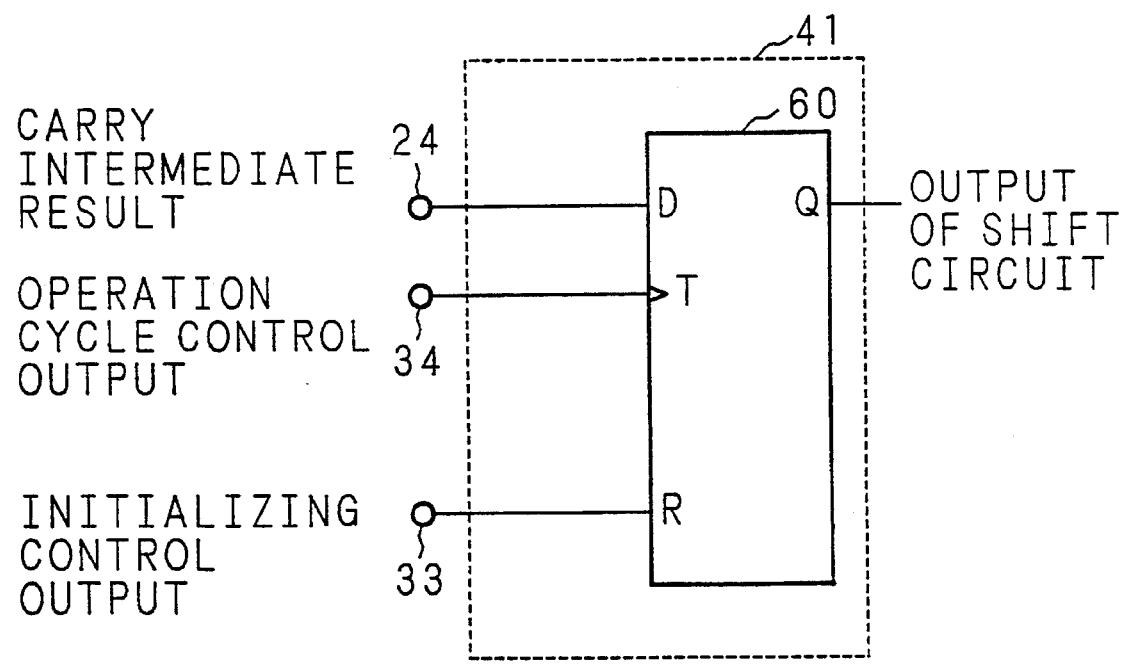
FIG. 12 is a block diagram showing a configuration of carry shift circuit constituting a multiplication array circuit of a conventional multiplying circuit.
Figure 14:
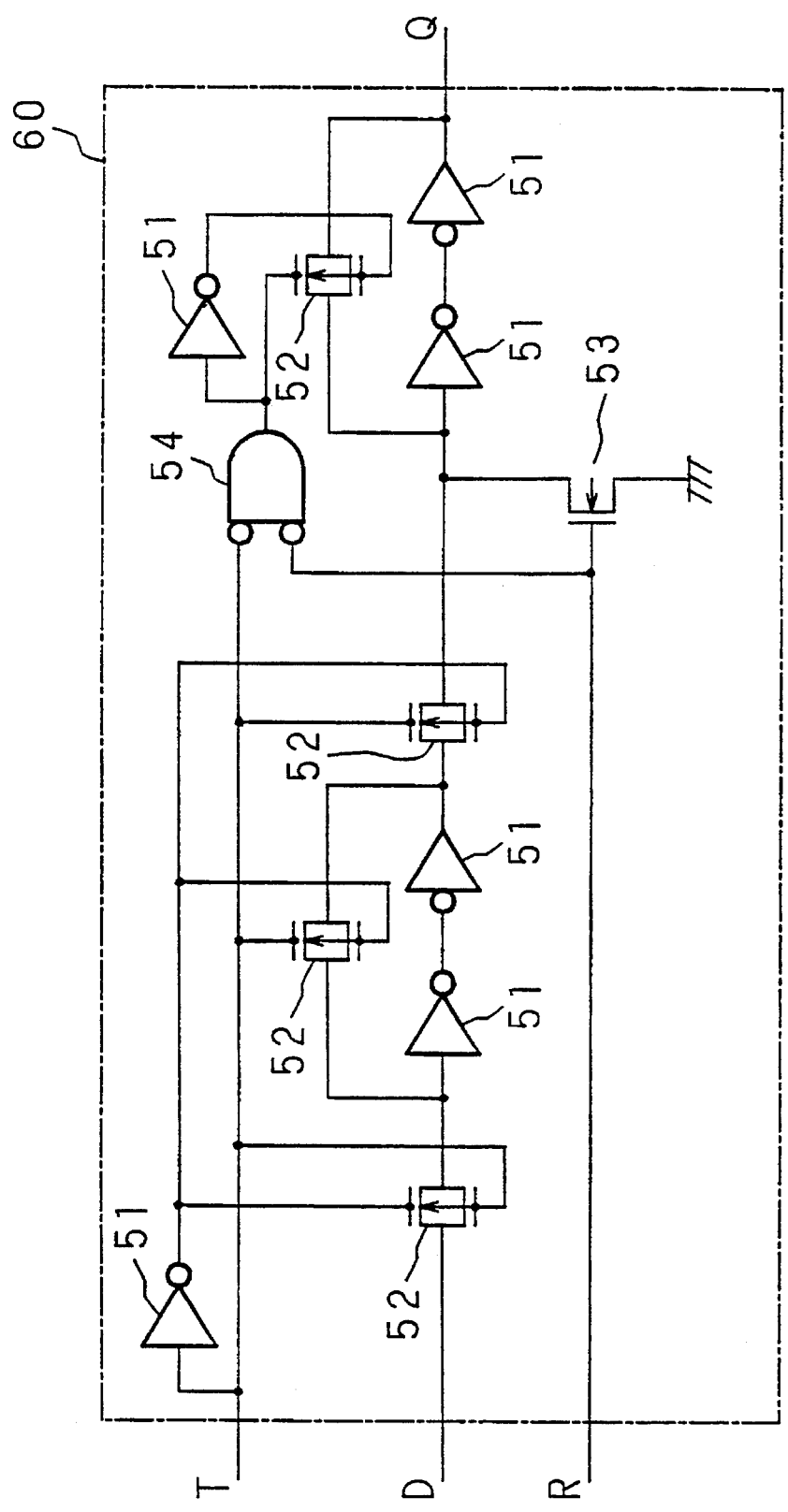
FIG. 14 is a circuit diagram showing an example of circuit configuration in case of realizing a carry shift circuit by a MOS transistor circuit.
Figure 15:
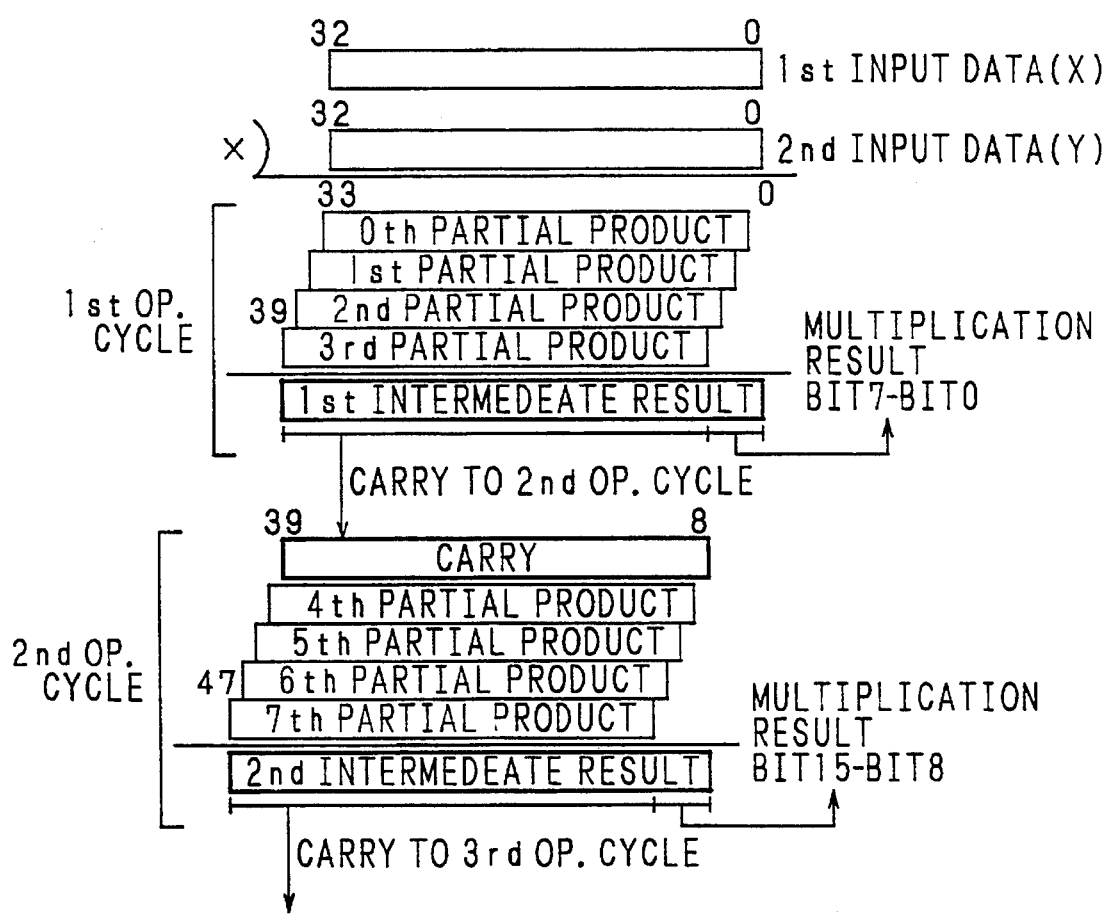
FIG. 15 is a schematic view showing how the multiplication shown in a schematic view of FIG. 9 is divided and executed by a conventional multiplying circuit shown in FIG. 10.
Figure 16:
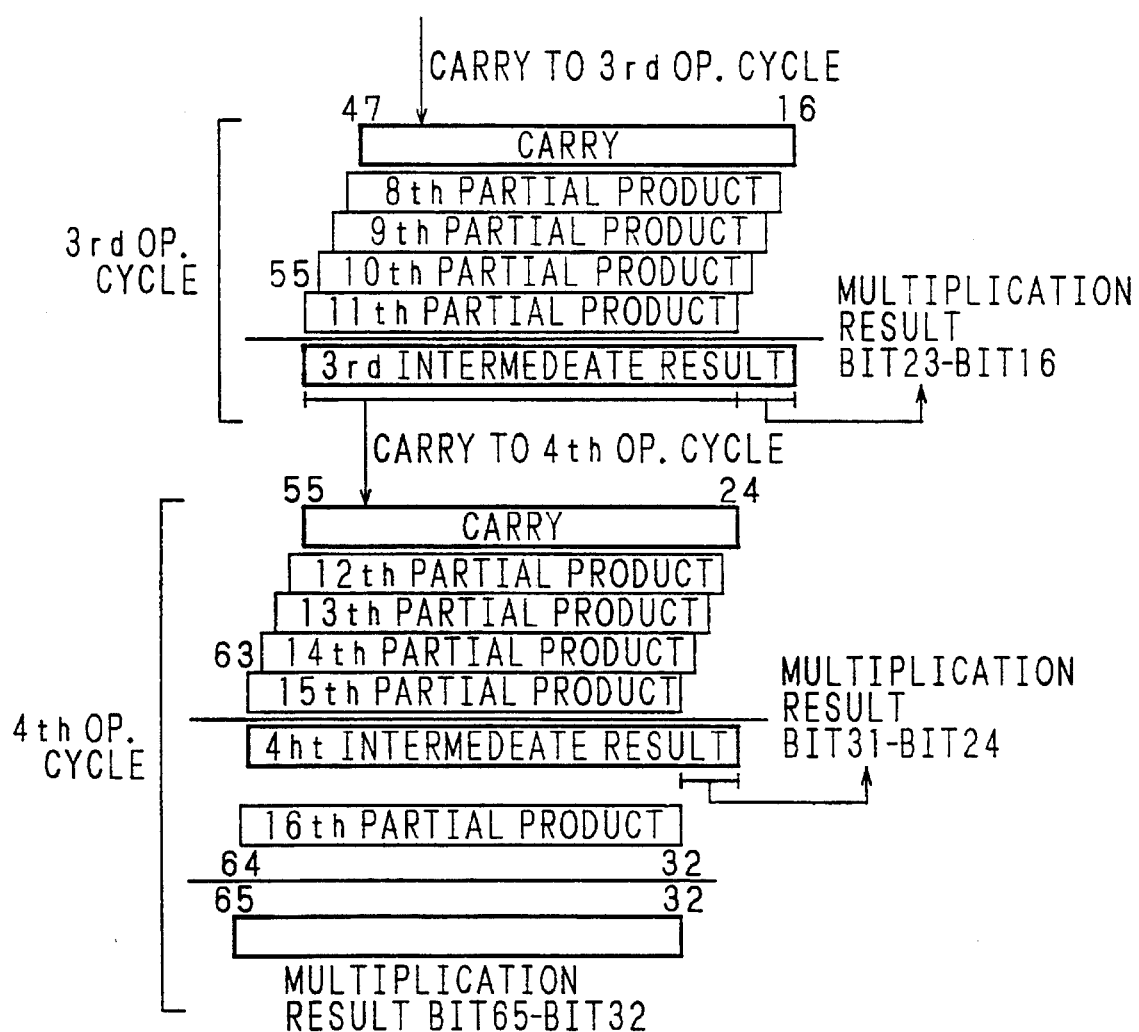
FIG. 16 is a schematic view showing how the multiplication shown in a schematic view of FIG. 9 is divided and executed by a conventional multiplying circuit shown in FIG. 10.

In the same way as the conventional example shown in FIG. 10, the multiplying circuit shown in FIG. 22 executes the 33 bits×33 bits multiplication in four times.

In FIG. 22 and FIG. 23, the same reference characters designate corresponding parts in respective drawings used for explaining the conventional example.

In FIG. 22 and FIG. 23, numeral 1 designates an input of a multiplier Y, numeral 2 designates an input of a multiplicand X, numeral 33 designates an initializing control input, numeral 34 designates an operation cycle control input, numeral 5 designates a multiplier dividing circuit, numeral 6 designates a multiplier carry latch, numerals 9a to 9d designate Booth decoders (BD), numeral 10 designates a multiplication array circuit, numerals 11a to 11d designate multiple generating circuits, and numerals 12a to 12d designate partial product adding circuits (ADD).

Numerals 13a to 13d designate 1st to 4th carry save type adders (CSA) constituting the partial product adding circuits 12a to 12d, numerals 14a to 14d designate 1st to 4th carry propagation type adders (CPA) constituting the partial product adding circuits 12a to 12d, numeral 15 designates a higher CPA circuit, numeral 40 designates an intermediate result shift circuit, numeral 41 designates a carry shift circuit included in the intermediate result shift circuit 40, numeral 42 designates a sum shift circuit included in the intermediate result shift circuit 40, numeral 43 designates a CPA carry latch included in the intermediate result shift circuit 40, numeral 30 designates a multiplication result lower output, and numeral 31 designates a multiplication result higher output.

Though the above configuration itself is similar to that of the conventional example shown in FIG. 10, in the second invention of the multiplying circuit of the present invention shown in FIG. 22 and FIG. 23, the 2 bits Y<1:0> at the lowest side of the multiplier Y are inputted not to the multiplier dividing circuit 5 but to the intermediate result shift circuit 40. All bits X<32:0> of the multiplicand X are also inputted to the intermediate result shift circuit 40 besides to the multiplication array circuit 10 in the same way as in the conventional example.

Thus, in the second invention, mainly the configuration of the intermediate result shift circuit 40 is different from the conventional example.

Figure 24:
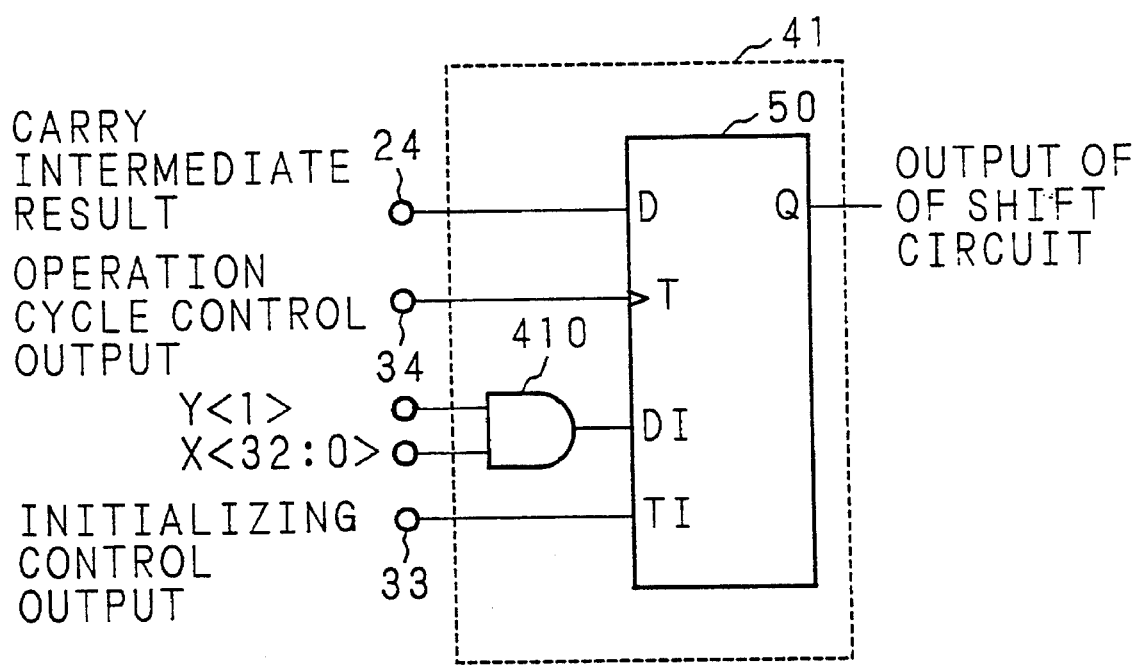
FIG. 24 is a block diagram showing an example of configuration of a carry shift circuit.
Figure 26:
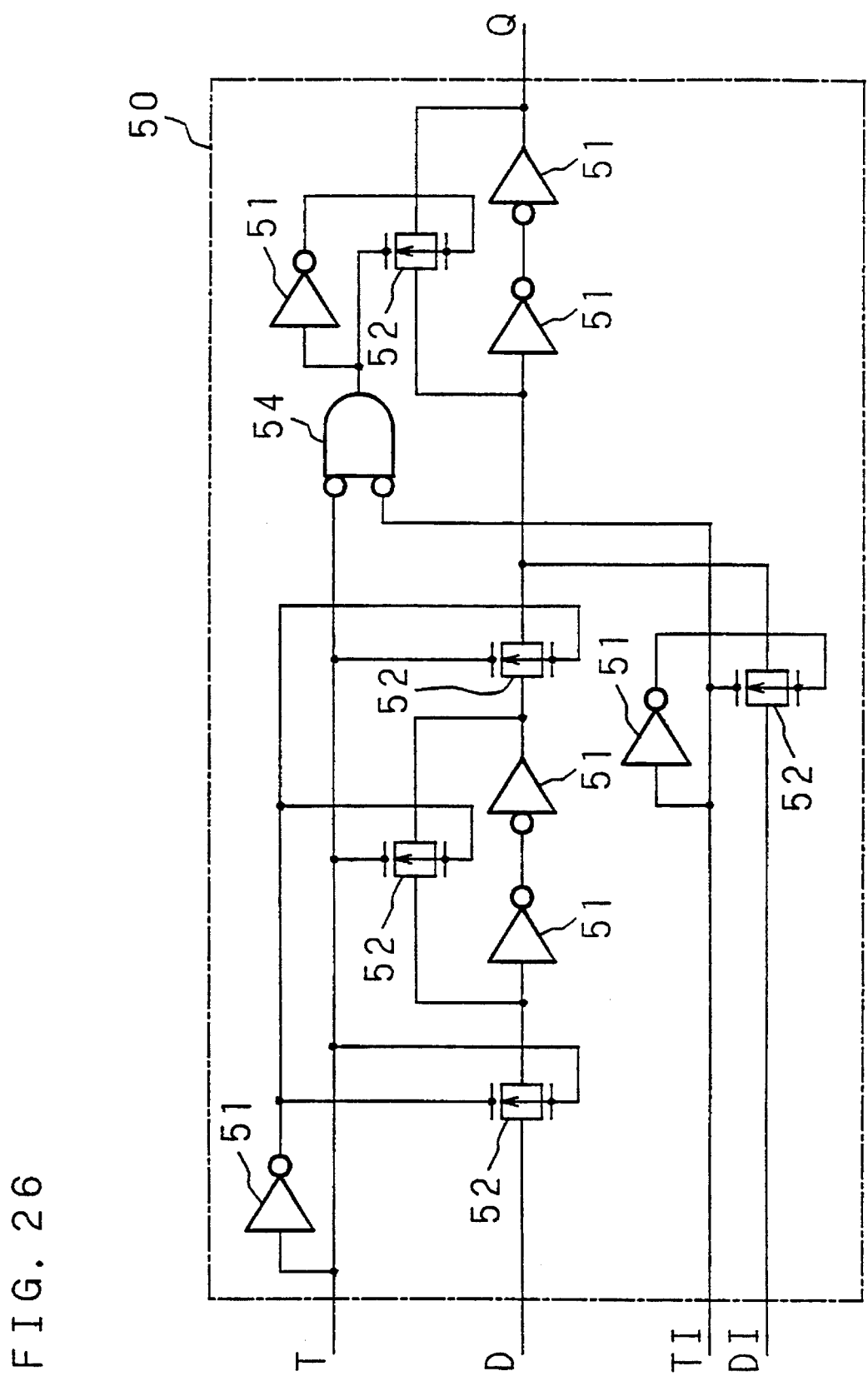
FIG. 26 is a circuit diagram showing an example of circuit configuration in case of realizing a carry shift circuit by a MOS transistor circuit.
Figure 28:
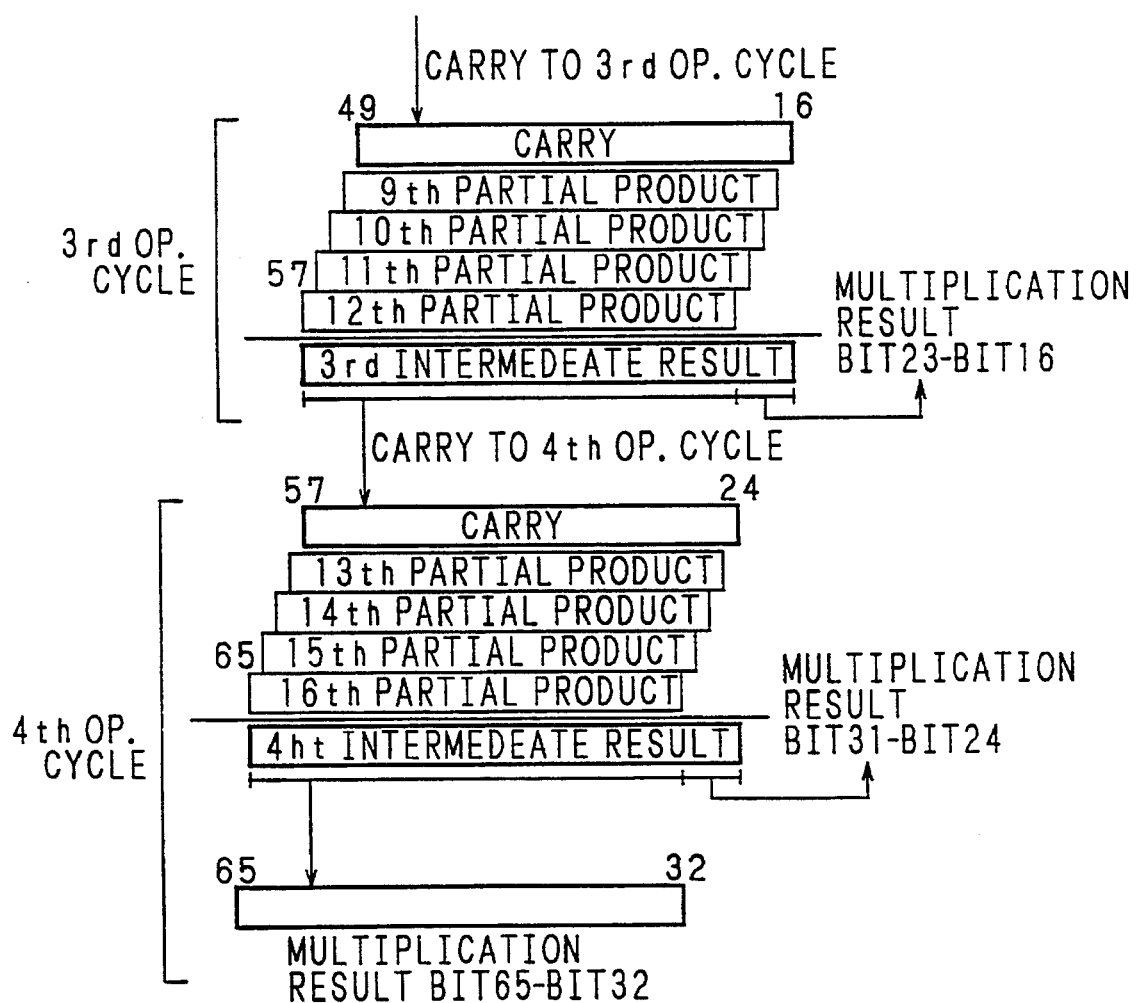
FIG. 28 is a schematic view showing the content of operation of a second invention of a multiplying circuit of the present invention divided into 4 operation cycles.

FIG. 24 to FIG. 26 are the views for explaining in detail of the carry shift circuit 41 of the intermediate result sift circuit 40 shown in FIG. 22. FIG. 24 is a block diagram showing an example of configuration of the carry shift circuit 41, FIG. 25 is a truth table for explaining its operation, and FIG. 28 is a circuit diagram showing an example of circuit configuration in case of realizing the carry shift circuit 41 by a MOS transistor circuit.

In FIG. 24 and FIG. 26, numeral 50 designates an initial data loaded D flip-flop constituting the carry shift circuit 41, numeral 51 designates inverters, numeral 52 designates transmission gates constituted by MOS transistors and numeral 54 designates a NOR gate.

The carry shift circuit 41 is that, an initializing control input 33 is inputted to an initializing signal input terminal T1, an output of an AND gate 410 is inputted to an initial data load terminal D1, a carry intermediate result 24 is inputted to a data terminal D and an operation cycle control input 34 is inputted to a trigger terminal T, a shift circuit output is outputted from an output terminal Q.

The Y<1> and X<32:0> are inputted to the AND gate 410.

Thus, a value of Y<1>×X<32:0> is loaded to the carry shift circuit 41 by the initializing control input 33, and in synchronism with the rising transition of the operation cycle control input 34, the carry intermediate result 24 is propagated to the output.

This operation is summarized in the truth table shown in FIG. 25.

A D flip-flop with reset 60 which is an essential portion of the carry shift circuit 41 can be constituted as the circuit diagram shown in FIG. 26 by using, for example, a CMOS circuit.

The sum shift circuit 42 can also be constituted in the same way as the carry shift circuit 41.

Next, the operation of the multiplying circuit of the second invention is described.

By inputting the initializing control signal 33, the higher bits of the multiplier Y excluding the lowest 2 bits Y<1:0> are inputted to the multiplier dividing circuit 5, and as a first output of the multiplier dividing circuit 5, the bits Y<9:2> of the multiplier Y is outputted. Simultaneously, the initializing control signal 33 resets the multiplier carry latch 6 and further, according to the value of the bits Y<1:0>, loads the multiplicand x to the intermediate result shift circuit 40 or resets the intermediate result, shift circuit 40.

More specifically, to the carry shift circuit 41, when the Y<1> is "1", X<32:0> is loaded and reset to "0" when the Y<1> is "0". As the result, the value of Y<1>×X is set in the carry shift circuit 41.

To the sum shift circuit 42, when the Y<0> is "1" X<32:0> is loaded and reset to "0" when the Y<0> is "0". As the result, the value of Y<0>×X is set in the sum shift circuit 42.

A first operation cycle is started in such a manner.

(1) Operation of the 1st operation cycle

The Y<9:2> outputted from the multiplier dividing circuit 5 and "0" which is an initial output of the multiplier carry latch 6 are inputted to the Booth decoders 9a to 9d, and are decoded by Booth algorithm. The 1st, 2nd, 3rd and 4th multiple generating circuits 11a to 11d respectively generate and output, the multiples corresponding to the values of Y<3:2>, Y<5:3>, Y<7:5> and Y<9:7> according to the outputs from the Booth decoders 9a to 9d. The outputs of the multiple generating circuits 11a to 11d are respectively inputted to the partial product adding circuits 12a to 12d, and the four multiple outputs and the initial values of the carry shift circuit 41 and the sum shift circuit 42 are added.

Here, explanation will be given on the operation of the partial product adding circuits 12a to 12d in detail.

"0" which is the initial value of the CPA carry latch 43, the lowest 2 bits of Y<0>×X which are initial values of the sum shift circuit 42, and the lowest 1 bit of Y<1>×X which is the initial value of the carry shift circuit 41 are inputted to the 1st CPA 14a, the 1st CSA 13a outputs their addition result as the lowest 2 bits of the multiplication result output 30.

A carry output of the 1st CPA 14a is sent to the 2nd CPA 14b.

While, since remaining bits of the Y<0>×X and Y<1>×X are inputted to the 1st CSA 13a from the sum shift circuit 42 and the carry shift circuit 41, the 1st CSA 13a adds these and the output of the 1st multiple generating circuit 11a.

At this time, since the Y<0>×X and Y<1>×X are inputted to the 1st CSA 13a by respectively shifting 2 bits and 1 bit to the lower side, adding digits are united.

The output of the 1st multiple generating circuit 11a corresponds to Y<3:2>×X, thus as the result of addition, the value of the Y<3:0>×X excluding the lowest 2 bits is outputted close to the right from the 1st CSA 13a in the form of a set of sum and carry.

The lower 2 bits of the 1st CSA 13a output are inputted to the 2nd CPA 14b for total addition including the carry propagation, and the Y<3;2> and carry to the 3rd CPA 14c are outputted.

In such a manner, the partial products are added subsequently as shifting the digit by 2 bits to output P<7:0> from the 1st to 4th CPA 14a to 14d, and the higher result of Y<9:0>×X is outputted from the 4th CSA 13d in the form of a set of sum and carry, and inputted respectively to the sum shift circuit 42 and the carry shift circuit 41.

The carry output of the 4th CPA 14d is saved in the CPA carry latch 43 and the value of Y<7> is saved in the Y carry latch 6.

(2) Operation of the 2nd operation cycle

Successively, the operation of the 2nd operation cycle is started in synchronism with changes in the operation cycle control signal 34.

Y<17:10> is outputted from the multiplier dividing circuit 5 as a 2nd output, the output of the multiplier carry latch 6 and the output of the intermediate result shift circuit 40, corresponding respectively to Y<9> and the higher 32 bits of the operation result of the 1st operation cycle, become a set of carry and sum.

Also, in the 2nd operation cycle, the multiplier is decoded and the multiples are generated in the same way as in the 1st operation cycle, and the multiplies are outputted to the adding circuits 12a to 12d.

To the adding circuits 12a to 12d, besides the multiples obtained in the 2nd operation cycle, a set of carry and sum corresponding to the higher 32 bits of the operation result of the 1st operation cycle is inputted from the intermediate result shift circuit 40 and added. As the result, the value of the Y<17:0>×X excluding the lower 8 bits is obtained.

The lower 8 bits as the result of 2nd operation cycle are outputted as P<15:8> of the multiplication result lower output 30, and the carry and sum corresponding to the higher bits are again inputted to the intermediate result shift circuit 40, and the 2nd operation cycle is completed.

Similarly, the 3rd and 4th operation cycles are executed, and P<23:16> and P<31:24> are outputted in order as the multiplication result lower output 30.

In the 4th operation cycle which is the final operation cycle, the higher bits of the multiplication result are outputted from the 4th CSA 13d.

However, since the operation Y<33:0>×X is performed, it is necessary that the 32-bit multiplier is subjected to sign extension to make Y<33>=Y<32>.

The multiplication result obtained in the form of carry and sum is inputted to the higher CPA circuit 15, and the addition including the carry propagation is performed and outputted to the multiplication result higher output 31.

Figure 27:
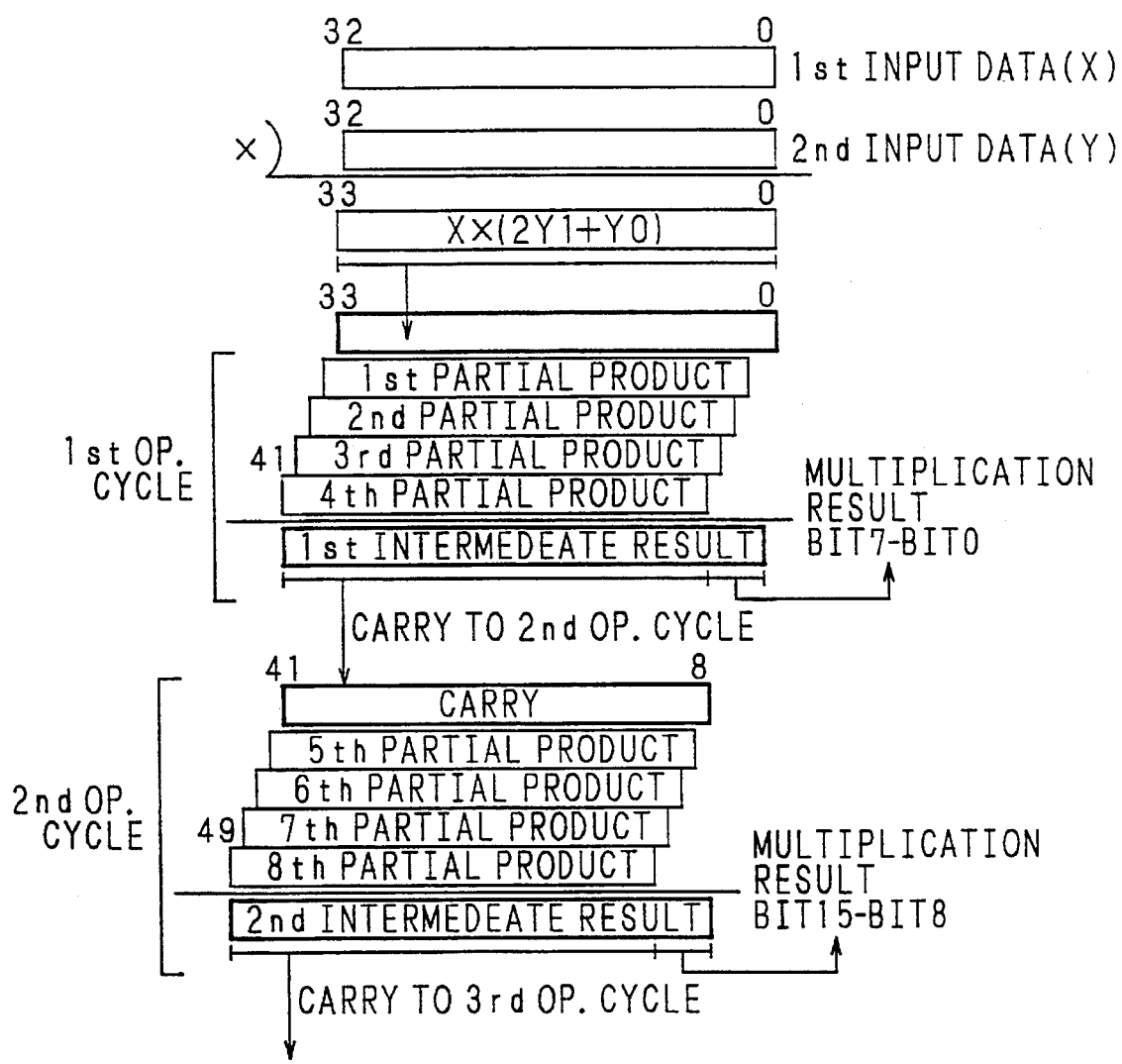
FIG. 27 is a schematic view showing the content of operation of a second invention of a multiplying circuit of the present invention divided into 4 operation cycles.

Schematic views of FIG. 27 and FIG. 28 show the contents of operation of the multiplying circuit divided into four operation cycles in FIG. 22 and FIG. 23 in one figure.

In the 1st operation cycle, the 1st to 4th partial products are added, in the 2nd operation cycle, the 5th to 8th partial products are added, in the 3rd operation cycle, the 9th to 12th partial products are added, and in the 4th operation cycle, the 13th to 16th partial products are added.

Furthermore, in the 1st operation cycle, in addition to the 2nd to 4th partial products, the initial value Y<1:0>×X of the intermediate latch is also added.

The higher operation result of the cycle before is added to the next cycle operation as the intermediate result. In the final 4th operation cycle, all additions are completed and the multiplication result is obtained.

Though an example of multiplying circuit using the second degree Booth algorithm is described in the above-mentioned embodiment, the present invention is also applicable to the multiplying circuit using the first degree Booth algorithm.

Also, though the multiplying circuit using the CSA as the partial product adder is shown in the above-mentioned embodiment, the present invention is also applicable to the multiplying circuit using only the CPA.

Furthermore, in the multiplying circuit constituted such that, the intermediate result shift circuit saves the carry and sum by using the CSA, the partial products for 2 bits of the multiplier can be operated by initializing the intermediate result shift circuit. And hence, an additional adder is not required when 1 or 2 bits of the multiplier remain by dividing the multiplication.

On the contrary, in the multiplying circuit constituted such that, the intermediate result shift circuit saves the intermediate result after the completion of carry operation by using the CPA, only the partial product for 1 bit of the multiplier can be operated by initializing the intermediate result shift circuit. And hence, an additional adder is not required when 1 bit of the multiplier remains by dividing the multiplication into a plurality of cycles for execution.

In the above-mentioned embodiment, it is shown that it is effective when extending 1 bit for, particularly, converting unsigned data into signed data for operation. However, the present invention is not necessarily restricted to such case, it is applicable widely for the purpose of reducing the frequency of additions at the time of dividing the multiplication into the plurality of cycles for execution.

As particularly described heretofore, according to the first invention of the multiplying circuit of the present invention, as compared with the conventional example, it is possible to decrease the number of gates of the sign extension circuit of the multiplier, and thereby to reduce the circuit scale.

Also, in the second invention, since the partial products corresponding to the lower bits of the multiplier are loaded to the intermediate result shift circuit at the time of starting the operation, and inputted to the adding circuits in the 1st operation cycle, the multiple generating circuits are not used for the partial products. As the result, a multiplier bit width inputted to the multiple generating circuit can substantially be reduced to reduce the circuit scale. Particularly, when the number of partial products remains by 1 due to the operation cycle division of the multiplication, since one of the lowest partial products is operated by initializing the shift circuit, the adding circuit is not need to be added.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalence of such meets and bounds thereof are therefore intended to be embraced by the claims.

What is claimed is:

1. A multiplying circuit, comprising:
   a multiplier sign extension circuit for performing sign extension of signed data inputted as a multiplier, according to a multiplier sign extension control signal designating the number of effective bits of the multiplier, by setting all values of invalid higher bits in the data inputted as the multiplier to "1";
   a plurality of Booth decoders which input output bits of said multiplier sign extension circuit by bits by bits for decoding by Booth algorithm, one Booth decoder receiving at least both the least significant invalid bit and the most significant effective bit of the multiplier as inputs;
   a multiplication array which inputs outputs of said Booth decoders and a multiplicand to output a product of the multiplicand and the multiplier; and
   a carry correcting means receiving said multiplier sign extension control signal and the most significant effective bit of the multiplier for setting "1" as the value of the most significant effective bit of the multiplier input to the Booth decoder receiving at least both the least significant invalid bit and the most significant effective bit of the multiplier as inputs.

2. A multiplying circuit, comprising:
   a multiplier sign extension circuit for performing sign extension of signed data inputted as a multiplier, according to a multiplier sign extension control signal designating the number of effective bits of the multiplier, by setting all values of invalid higher bits in the data inputted as the multiplier to "0".
   a plurality of Booth decoders which input output bits of said multiplier sign extension circuit by bits by bits for decoding by Booth algorithm, one Booth decoder receiving at least both the least significant invalid bit and the most significant effective bit of the multiplier as inputs;
   a multiplication array which inputs outputs of said Booth decoders and a multiplicand to output a product of the multiplicand and the multiplier; and
   a carry correcting means receiving said multiplier sign extension control signal and the most significant effective bit of the multiplier for setting "0" as the value of the most significant effective bit of the multiplier input to the Booth decoder receiving at least both the least significant invalid bit and the most significant effective bit of the multiplier as inputs.

3. A multiplying circuit, comprising:
   a multiplier sign extension circuit for performing sign extension of signed data inputted as a multiplier, according to a multiplier sign extension control signal designating the number of effective bits of the multiplier, by setting all values of invalid higher bits in the data inputted as the multiplier to either "1" or "0".
   a plurality of Booth decoders which input output bits of said multiplier sign extension circuit by bits by bits for decoding by Booth algorithm, one Booth decoder receiving at least both the least significant invalid bit and the most significant effective bit of the multiplier as inputs;
   a multiplication array which inputs outputs of said Booth decoders and a multiplicand to output a product of the multiplicand and the multiplier; and
   a carry correcting means receiving said multiplier sign extension control signal and the most significant effective bit of the multiplier for setting either "1" or "0" as the value of the most significant effective bit of the multiplier input to the Booth decoder receiving at least both the least significant invalid bit and the most significant effective bit of the multiplier as inputs.

4. A multiplying circuit which inputs a multiplicand, a multiplier, an initializing control signal and an operation cycle control signal, and multiplies the multiplier and the multiplicand, comprising:

a multiplier dividing circuit
receiving all bits of the data input as the multiplier except for a predetermined number of the least significant bits, and said operation cycle control signal,
dividing the multiplier data into a plurality of bits, and successively outputting the respective divided bits in synchronism with changes of said operation cycle control signal;

a plurality of Booth decoders decoding respective outputs of said multiplier dividing circuit according to Booth algorithm;

a plurality of multiplier generating circuits receiving respective outputs of the Booth decoders and the multiplicand, and respectively outputting multiples of the multiplicand;

adding circuits receiving respective outputs of said plurality of multiplier generating circuits, and respectively adding the multiples; and an intermediate result shift circuit receiving said predetermined number of the least significant bits of the multiplier data, the multiplicand, said initializing control signal and said operation cycle control signal, and in synchronization with said initializing control signal holding the multiplicand value in response to values of said predetermined number of the least significant bits of the multiplier data,
subsequently inputting the output of one of said adding circuits and temporarily holding said output, and
supplying the held output to an input of another of said adding circuits.

* * * * *